United States Patent
Tateishi et al.

(10) Patent No.: US 6,466,924 B1
(45) Date of Patent: Oct. 15, 2002

(54) VERIFICATION METHOD OF NEURAL NETWORK AND VERIFICATION APPARATUS THEREOF

(75) Inventors: Masahiko Tateishi, Nagoya (JP); Shinichi Tamura, Tajimi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/323,107

(22) Filed: Jun. 1, 1999

(30) Foreign Application Priority Data

Dec. 2, 1997 (JP) .............................................. 9-332068

(51) Int. Cl.$^7$ .............................................. G06F 15/18
(52) U.S. Cl. .............................. 706/15; 700/28; 700/48
(58) Field of Search .............................. 706/20, 22, 15; 700/28, 48

(56) References Cited

U.S. PATENT DOCUMENTS 5,841,949 A * 11/1998 Nakaya et al. ................. 706/59

FOREIGN PATENT DOCUMENTS

| JP | 2-246485 | 10/1990 |
|----|----------|---------|
| JP | 2-266458 | 10/1990 |
| JP | 2-310779 | 12/1990 |
| JP | 5-189398 | 7/1993 |
| JP | 7-249089 | 9/1995 |

OTHER PUBLICATIONS

Simon Haykin, McMaster University, Hamilton, Ontario, Canada, "Neural Networks, A Comprehensive Foundation," Chapter 6 & Chapter 7, IEEE Computer Society Press, IEEE Press ®, Copyright ©1994 by Macmillan College Publishing Company, Inc..*

Franco Buffa, Ignazio Porceddu, Stazione Astronomica Cagliari, Temperature forecas and dome seeing minimization,I. A case study using a neural network model, TNG Technical Report n. 67, F. Buffa, I. Porceddu, Oct. 1997.*
An Extension of the BP–Algorithm to Interval Input Vectors—Learining from Numericaql Data and Exper's Knowledge,Hisao Ishibuchi and Hidea Tanaka; (1991) IEEE International Joint Conference on Neural Networks, vol. 2 of 3, pp. 1588–1593.*

(List continued on next page.)

*Primary Examiner*—Thomas Black
*Assistant Examiner*—Michael B. Holmes
(74) *Attorney, Agent, or Firm*—Harness, Dickey & Pierce, PLC

(57) ABSTRACT

A verification method and a verification apparatus of a neural network for guaranteeing the operation of the neural network to any input signals which might be inputted. The neural network verification apparatus comprises a data file storage section for storing a verification data file DFK concerning on the structure of the neural network to be verified, a network structuring section for structuring a neural network NET to be verified by reading the neural network data file DFN from the data file storage section, an input data generating section for generating initial interval input vector database DBI by reading the verification data file DFK from the data file storage section, a verification executing section for executing the verification of the neural network NET based on the neural network NET structured by the network structuring section and the initial interval input vector database DBI created by the input data generating section and for generating a verification result database DBO based on the verification result, and others. The verification apparatus generates an interval input vector signal per input signal subspace which is obtained by dividing an input signal space formed by the input signal to the neural network NET into a plurality of input. signal subspaces and accumulates them in a stack.

23 Claims, 18 Drawing Sheets

OTHER PUBLICATIONS

Limiting the Effects of Weight Errors in Feed Forward Networks Using Interval Arithmetic, Davide Anguita; Sandro Ridella; Stefano Rovetta; Rodolfo Zunino; (1996) IEEE Internationa Conference on Neural Networks, pp. 414–417.*

Search listing www.google.com.*

R. Baker Kearfott, "Rigorous Global Search: Continuous Problems," Nonconvex Optimization and Its Applications, vol. 13, pp. 1–17, 26–31, 169–175 and v.

Ishibuchi et al, "An Extension of the BP–Algorithm to Interval Input Vectors—Learning from Numerical Data and Expert's Knowledge –," 1991 IEEE International Joint Conference On Neural Networks, vol. 2 of 3, pp. 1588–1593.

Rumelhart et al, "Parallel Distributed Processing Explorations in the Microstructure of Cognition," vol. 1: Foundations, Chapter 8, 9 pages and 3 pages index.

Anguita et al, "Limiting the Effects of Weight Errors in Feed Forward Networks Using Interval Arithmetic," The 1996 IEEE International Conference On Neural Networks, Jun. 3–6, 1996, pp. 414–417.

* cited by examiner

VERIFICATION METHOD OF NEURAL NETWORK AND VERIFICATION APPARATUS THEREOF

CROSS REFERENCE TO RELATED APPLICATION

This application is based on Japanese Patent Application No. Hei. 9-332068 filed on Dec. 2, 1997, the contents of which are incorporated herein by reference.

BACKGROUND OF THE INVENTION

1. Field of the Invention

The present invention relates to a verification method, a verification apparatus and a recording medium of a neural network, and more particularly to a verification method, a verification apparatus and a recording medium of a neural network for setting synaptic weight so that an error between a neural network output signal and a teacher output signal falls within an a tolerance.

2. Description of the Related Art

Hitherto, there has been known a neural circuit network (also called as a neural network) comprising an input layer, an intermediate layer, an output layer, each layer having one or more units for generating transmission signals, and synapses connecting the units in the respective layers to transmit the transmission signals. In the neural network, each synapse has synaptic weight and a desirable input/output characteristic may be realized by adequately changing the synaptic weight through a learning process.

It is noted that the learning of the neural network is a process of calculating a network output signal when a teacher input signal is inputted to the neural network and of minimizing an error between a teacher output signal and the network output signal, e.g., a sum of square error, by changing each synaptic weight based on the result of comparison between the network output signal and the teacher output signal which represents the characteristic to be realized.

Then, having a tolerance of $\pm\epsilon$ with respect to the teacher output signal $t(x)$ as shown in FIG. 13A, the learning is carried out such that the error $(n(x)-t(x))$ between the network output signal $n(x)$ and the teacher output signal $t(x)$ falls within this tolerance $\pm\epsilon(|n(x)-t(x)|<\epsilon)$ with respect to all actually possible input signals as shown in FIG. 13B.

By the way, while the neural network is being widely applied to pattern recognition, data processing and others, it has come to be applied more in the control of air-conditioners. When the neural network is thus incorporated in a product to make various controls, it is necessary to assure that a correct output signal is always outputted from the neural network with respect to any input signal which may be inputted to the neural network.

However, because the output characteristic of the neural network in which the synaptic weight is set by learning cannot be described by a simple logic of if-then rule and the like, it is difficult to verify it by internal analysis. Therefore, a method of preparing signals (test data) which might be inputted as much as possible and of actually inputting those signals to confirm whether or not a desired output signal is obtained one by one has been adopted in general.

However, when the check is carried out by actually inputting the test data as described above, there has been a possibility that the operation of the neural network is assured only at check points xp and a part ER that exists between the check points xp and deviates from the tolerance is missed as shown in FIG. 13C. Although it might be possible to prevent such possibility by increasing test data, there has been a possibility that it takes time for the verification as the test data is increased. The points (ranges) to be checked also increase exponentially as the types of input signals increase. Specifically, when the input signal is a continuous signal, points to be checked exist infinitely. That is, it is unable to check most of the points and the assurance for all input signals cannot be made no matter how much test data is increased.

SUMMARY OF THE INVENTION

It is an object of the invention to solve the above-mentioned problems by assuring the operation of a neural network for any input signals, which might be inputted.

A neural network verification method or a verification apparatus of the invention verifies the neural network by setting a range of each input signal inputted to an input layer respectively as one-dimensional input signal space, by dividing a m-(m is an integer of 1 or more) dimensional input signal space to the input layer into a plurality of input signal subspaces and by judging an error between a network output signal and a teacher output signal per such input signal subspace.

The invention enables the whole input signal space to be verified without omission because it checks (judges the error) per input signal subspace, unlike the check made by test data which checks certain points within the input signal.

DESCRIPTION OF THE PREFERRED EMBODIMENTS

Preferred embodiments of the invention will be explained below with reference to the drawings.

First Embodiment

Figure 1:
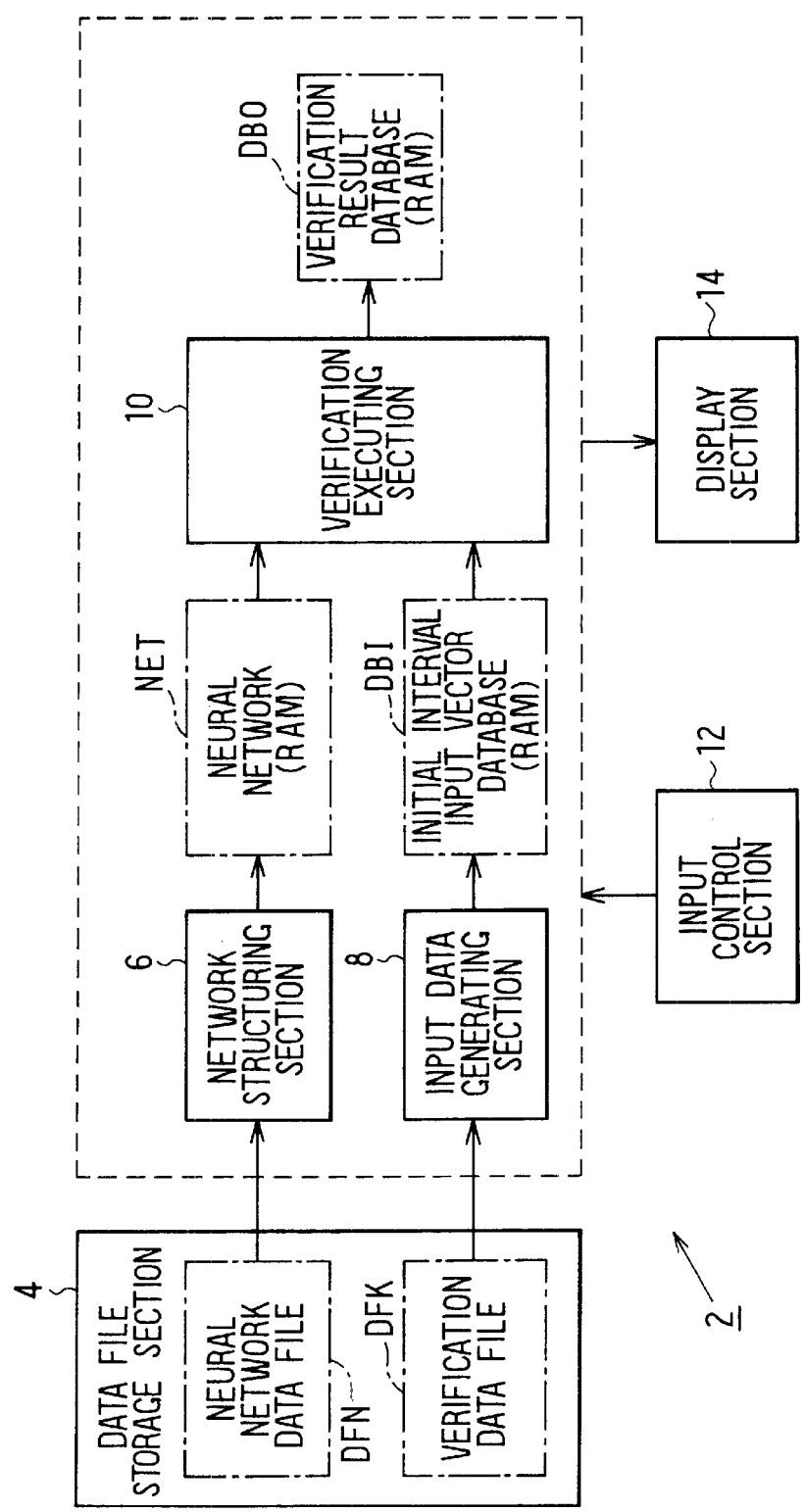
FIG. 1 is a block diagram schematically showing the structure of a neural network verification apparatus of a first embodiment.

FIG. 1 is a block diagram schematically showing the structure of a neural network verification apparatus 2 to which the present invention is applied.

The neural network verification apparatus 2 of the present embodiment comprises a data file storage section 4, a network structuring section 6, an input data generating section 8, a verification executing section 10, an input control section 12 and a display section 14 as shown in FIG. 1.

The data file storage section 4 stores a neural network data file DFN composed of data related to the structure of a neural network to be verified (coupling relationship of synapses, synaptic weight, type of output function, etc.) and a verification data file DFK composed of data of an obtainable range of input signals inputted to the neural network to be verified, data for defining a teacher output signal and others.

The network structuring section 6 reads the neural network data file DFN from the data file storage section 4 and structures neural network NET to be verified.

The input data generating section 8 reads the verification data file DFK from the data file storage section 4 in the same manner and structures an initial interval input vector database DBI described later.

The verification executing section 10 executes the verification of the neural network NET based on the neural network NET structured by the network structuring section 6 and the initial interval input vector database DBI created by the input data generating section 8 and creates a verification result database DBO based on the result of verification.

The input control section 12 is what inputs various commands to each section described above and is composed of a keyboard, a mouse or the like.

The display section 14 is what displays the procedure for controlling the input control section 12 and the contents of the verification result database DBO and is composed of a display unit or the like.

It is noted that the verification apparatus 2 of the present embodiment is constructed on a general-purpose computer constructed centering on a CPU, a ROM, a RAM and an I/O port such as a workstation. The network structuring section 6, the input data generating section 8 and the verification executing section 10 are realized as processes executed by the CPU and the neural network NET, the initial interval input vector database DBI and the verification result database DBO are created on the RAM. The data file storage section 4 is composed of an external storage unit such as a hard disk, a magnetic disk, a floppy disk or the like.

The network verification process executed by the CPU will be explained below along a flowchart shown in FIG. 2. It is noted that the program of this process may be stored in the ROM in advance or may be loaded to the RAM from the external storage such as a floppy disk not shown.

When the CPU starts this process, it judges whether or not the file name of the neural network data file DFN and the verification data file DFK and a tolerance s employed in the process described later are inputted via the input control section 12 in Step (hereinafter abbreviated simply as S) 110. When they are inputted, the CPU advances to S120. in S120, the CPU reads the neural network data file DFN from the data file storage section 4 in accordance to the file name inputted in S110 and based on the contents thereof, executes the process of the network structuring section 6 for structuring the neural network NET to be verified on the RAM.

The neural network NET created at this time comprises an input layer (first layer), an intermediate layer (second to (NL-1) layers), an output layer (NL layer) composed of a total number NU of units $U_j$ (j=1, 2, ... NU) for generating transmission signals and synapses for connecting the units $U_j$ among the respective layers to transmit the transmission signals.

It is noted that the i-th layer (i=1, 2, ... NL) is composed of $M_i$ ($M_1+M_2+ ... +M_{NL}$=NU) units, respectively, and a number of units in the input layer is set as $M_1$=M and a number of units in the output layer as $M_{NL}$=1 specifically in the present embodiment. However, the number of units in the output layer $M_{NL}$ may be a plural number.

Among them, a unit $U_m$ (m=1, 2, ... M) composing the input layer is configured so as to output an input signal $x_m$ to the next layer as it is as a transmission signal $O_m$. An unit $U_n$ (n=M+1, M+2, ... NU-1) composing the intermediate layer (second to (NL-1) layer) is configured so as to generate a transmission signal to be transmitted to the next layer by using the transmission signal inputted from the previous layer, synaptic weight set in correspondence to the transmission signal and an output function defined in advance.

That is, an unit $U_j$ of the i-th layer (=2, 3, ... NL-1) is configured so as to generate a transmission signal $O_j$ to be transmitted to the next layer by calculating a weighting signal $net_j$ by the following equation (20) and by using the output function $f(x)=1/\{1+\exp(-x)\}$ composed of a sigmoid function from the equation (21), where $\omega_{jk}$ is the synaptic weight to the transmission signal $O_k$ from the (i-1)th layer $U_k$, $b_j$ is bias at the unit $U_j$, and C(j) is a set of numbers of units $U_k$ which send the transmission signal $O_k$ to the unit $U_j$:

$$net_j = b_j + \sum_{k \in C(j)} w_{jK} O_k \quad (20)$$

$$O_j = f(net_j) \quad (21)$$

The unit $U_{NU}$ in the output layer (NL-th layer) is configured similarly to the unit $U_n$ of the intermediate layer. A transmission signal $O_{NU}$ generated by this unit $U_{NU}$ turns out to be a network output signal n(x) which is an output of the neural network NET.

In S130, the CPU reads the verification data file DFK from the data file storage section 4 in accordance to the file name inputted in S110 and based on the contents thereof, executes the process as the input data generating section 8 for generating the initial interval input vector database DBI.

An interval input vector signal $I_s$ created as described below is stored in the initial interval input vector database DBI.

Figure 4:
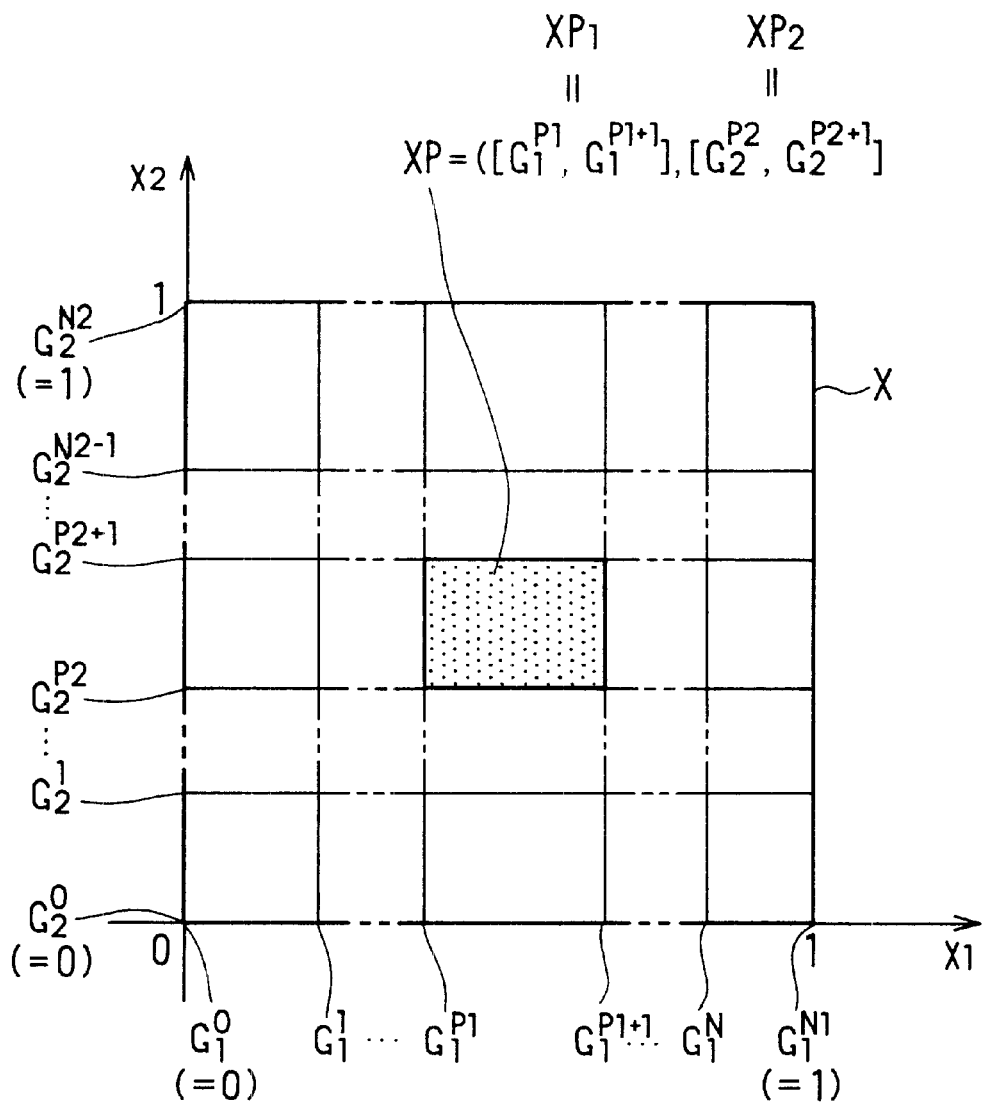
FIG. 4 is a chart for explaining a method for generating an interval input vector signal.

That is, when there are M input signals (i.e., a number of units in the input layer is M) inputted to the neural network NET, an obtainable value of each input signal is normalized in a range of 0 to 1 and each normalized input signal is set as one-dimensional input signal space $X_m \subset [0, 1]$ (m=1 to M), respectively, to consider an M-dimensional input signal space $X (=X_1 \times X_2 \times \ldots X_M \subset [0, 1]^M)$. FIG. 4 shows the case when M=2 to facilitate understanding thereof.

Then, $N_m+1$ dividing points $G_m^l$ (l=0 to $N_m$) are provided per each input signal space $X_m$ so as to satisfy the relationship of the following equation (23):

$$G_m^0(=0) < G_m^1 < \ldots < G_m^{Nm}(=1) \qquad (23)$$

The dividing points are supposed to be set in the verification data file DFK in advance.

Based on this dividing points $G_m^l$, each one-dimensional input signal space $X_m$ is divided into $N_m$ input signal subspaces as follows;

$$[G_m^0, G_m^1][G_m^1, G_m^2] \ldots [G_m^{Nm-1}, G_m^{Nm}] \qquad (24)$$

Then, corresponding to that, the M-dimensional input signal space X is divided into $N_{PX}$ (=$N_1 \cdot N_2 \ldots \cdot N_m$) M-dimensional input signal subspaces XP as shown in the following equation (25);

$$XP=[G_1^{p1}, G_1^{p1+1}] \times [G_2^{p2}, G_2^{p2+1}] \times \ldots \times [G_M^{pM}, G_M^{pM+1}] \qquad (25)$$

(Provided that pm=0, 1, ... $N_{m-1}$)

The following M-dimensional interval input vector signal $I_s$ (s=1 to $N_{PX}$) is generated for each of these input signal subspaces XP.

$$I_s=([G_1^{p1}, G_1^{p1+1}][G_2^{p2}, G_2^{p2+1}] \ldots [G_M^{pM}, G_M^{pM+1}])^t \qquad (26)$$

The interval input vector signal $I_s$ thus generated is called specifically as an 'initial interval input vector signal' and is stored in the initial interval input vector database DBI.

In S140, the CPU judges whether or not a verification start command for instructing to start the verification of the neural network NET is inputted from the input control section 12 and when the verification start command is inputted, the CPU advances to S150 to read the interval input vector signals $I_s$ from the initial interval input vector database DBI generated in S130 one after another to accumulate in the stack.

It is noted that the stack is a so-called LIFO (Last In First Out) memory which outputs data inputted last at first and is formed on the RAM similarly to the initial interval input vector database DBI and others. Then, the interval input vector signal $I_s$ which is accumulated last and located at the stack top is denoted as Xtop and is represented by the following equation (27). This equation is what the symbols in the equation (26) are replaced and is totally equivalent to the equation (26):

$$X\text{top}=([x_1^L, x_1^U][x_2^L, x_2^U] \ldots [xM^L, xM^U])^t \qquad (27)$$

Further, each element $[x_1^L, x_1^U][x_2^L, x_2^U] \ldots [x_M^L, x_M^U]$ composing the interval input vector signal Xtop will be called as an interval element and denoted also as $XP_1$, $XP_{21}$ ... $XP_M$.

Next, the CPU takes out the interval input vector signal Xtop at the stack top in S160 and calculates an interval teacher output signal $t(X\text{top})=[t^L, t^U]$ corresponding to this interval input vector signal Xtop in S170. In S180, the CPU calculates an interval network output signal $n(X\text{top})=[n^L, n^U]$ representing the obtainable range of the network output signal n(x) with respect to an input signal belonging to the interval input vector signal Xtop at the same stack top by means of interval arithmetic.

It is noted that the interval teacher output signal t(Xtop) may be calculated readily by applying the interval arithmetic to that function when the teacher output signal is defined by a function for example. The detail thereof will be explained by citing a concrete example in the column of [First Exemplary Calculation] described later.

Here, the detail of the process for calculating the interval network output signal $n(X\text{top})=[n^L, n^U]$ will be explained in reference to a flowchart shown in FIG. 5.

That is, when the CPU starts this process, it initializes an interval transmission signal $O_m$ which is outputted from each unit $U_m$ (m=1, 2, ... M) of the input layer (first layer) in S310. In concrete, the CPU sets an interval element $XP_m=[X_m^L, x_m^U]$ of the interval input vector signal Xtop as it is as the interval transmission signal $O_m$.

That is, the interval transmission signal $O_m$ represents the obtainable value of the transmission signal $O_m$ outputted from the unit $U_m$ (m=1, 2, ... M) when an interior point of the interval element $XP_m$ is inputted to the unit $U_m$. It is because the unit $U_m$ of the input layer outputs the input signal as it is as the transmission signal $O_m$ as described above.

It is noted that the head of the signal used in the interval arithmetic is denoted by the capital letter in order to discriminate the signal, e.g., the transmission signal $O_m$, used in the normal operation from the signal, e.g., the interval transmission signal $O_m$, used in the interval arithmetic.

Next, the CPU sets a counter j for discriminating the unit $U_j$ at M+1 to specify the least number unit in the intermediate layer in S320. Then, the CPU calculates an interval weighting function $Net_j$ for the unit $U_j$ in accordance to the following equation (28) in S330. It is noted that $b_j$, $w_{jk}$ and C(j) are the same with those explained in connection as the previous equation (20):

$$Net_j = b_j + \sum_{k \in C(j)} W_{jK} o_k \qquad (28)$$

In S340, the CPU calculates an interval transmission signal $O_j$ at the unit $U_j$ with respect to the interval input vector signal Xtop by implementing the interval arithmetic by using the interval weighting signal $Net_j=[net_j^L, net_j^U]$ calculated in S330 instead of the variable x of the output function f(x).

It is noted that the interval transmission signal $O_j$ turns out as $O_j=[f(net_j^L), f(net_j^U)]$ because the sigmoid function which is a monotone increasing function is used as the output function f(x) in the present embodiment. The CPU increments the counter j in S350 and judges whether or not the value of the counter j is equal to or less than the number of whole units NU in the neural network NET in S360. When it is judged to be YES, the CPU returns to S330 to calculate the interval transmission signal $O_j$ for the next unit $U_j$.

When it is judged to be NO in S360 on the other hand, i.e., when the calculation of the interval transmission signal $O_j$ has been finished for all of the units $U_j$ in the intermediate and output layers (second to NL layers) of the neural network NET, the CPU advances to S370 to set an interval transmission signal $O_{NU}$ at the unit $U_{NU}$ in the output layer (NL-th layer) as the interval network output signal n(Xtop) with respect to the interval input vector signal Xtop and ends this process.

It is noted that the process for calculating the interval network output signal n(Xtop) with respect to the interval input vector signal Xtop described above is what the interval arithmetic is applied to a process for calculating the network output signal n(x) with respect to a real number input vector signal x which is a known technology (see McClelland, J. L., Rumelhart, D. E., and the PDP Research Group, "Parallel Distributed Processing: Explorations in the Microstructure of Cognition", MIT Press, Chapter 8, (1986), for example). Its whole procedure and the like are totally same as the process for calculating the network output signal n(x) except in that various operations are replaced with the interval arithmetic.

Its detail is described in H, Ishibuch and H. Tanaka, "An Extension of the BP Algorithm to Interval Input Vectors: Learning from Numerical Data and Expert's Knowledge", Int., Joint Conf. on Neural Networks, Singapore, pp. 1588–1593, 1991.

Figure 2:
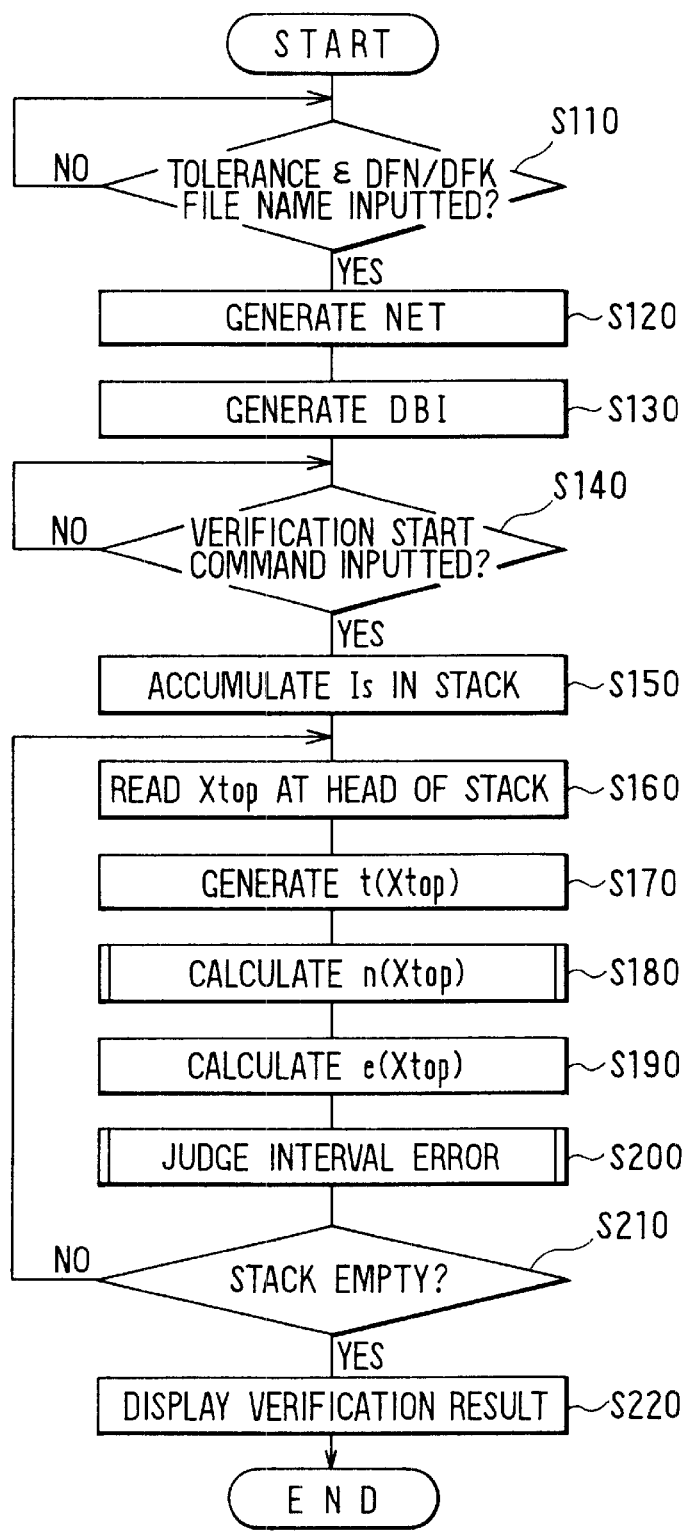
FIG. 2 is a flowchart showing a verification process executed by a CPU of the verification apparatus.
Figure 3:
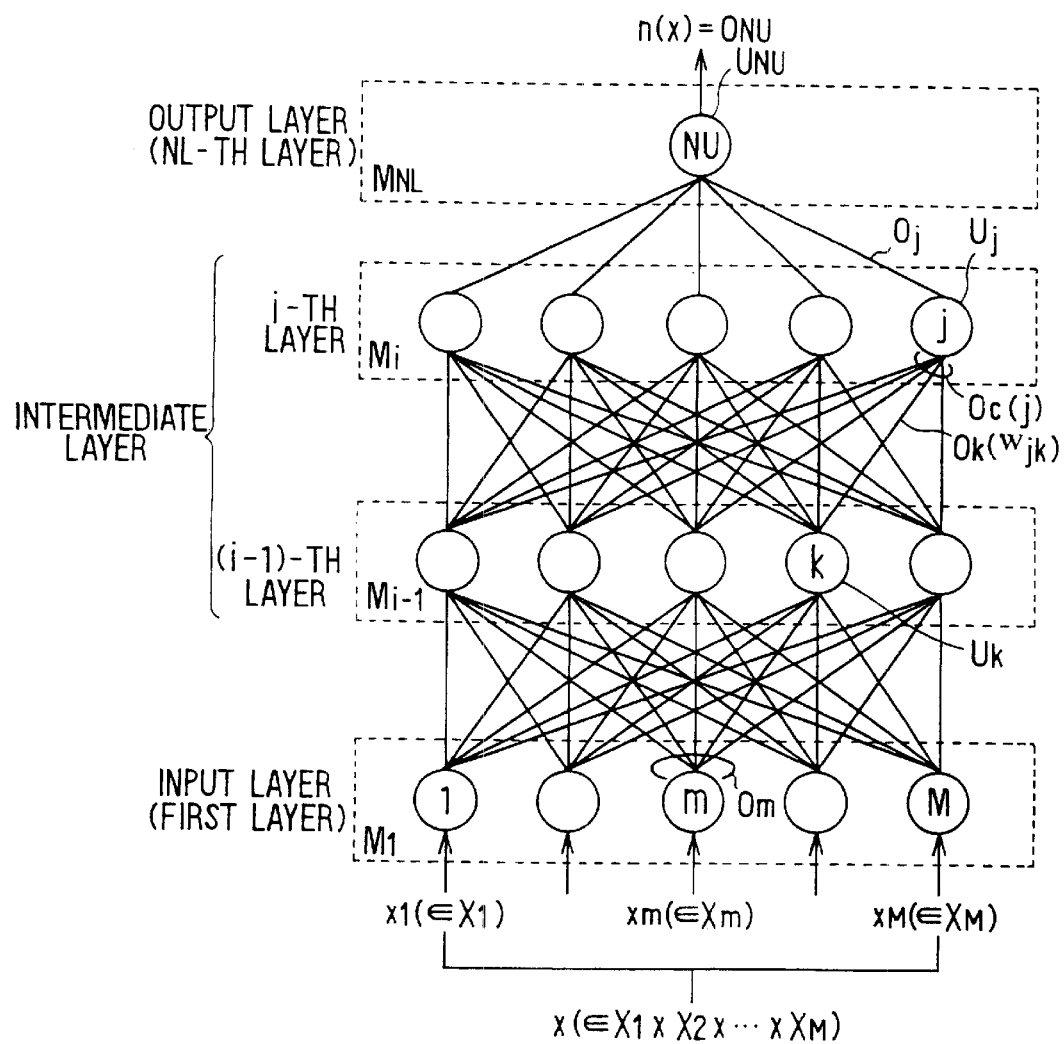
FIG. 3 is a chart for explaining the configuration of the neural network which is to be verified.

Next, returning to the flowchart in FIG. 2, the CPU calculates an interval error E=e(Xtop)=[$e^L$, $e^U$] from the interval teacher output signal t(Xtop) calculated in S170 and the interval network output signal n(Xtop) calculated in S180 by using the interval arithmetic by the following equation (50):

$$E = e(Xtop) = t(Xtop) - n(Xtop) \quad (50)$$
$$= [t^L, t^U] - [n^L, n^U] = [t^L - n^U, t^U - n^L]$$

In S200, the CPU judges the interval error E calculated in S190 with respect to the tolerance e inputted previously in S110 and then advances to S210.

Figure 6:
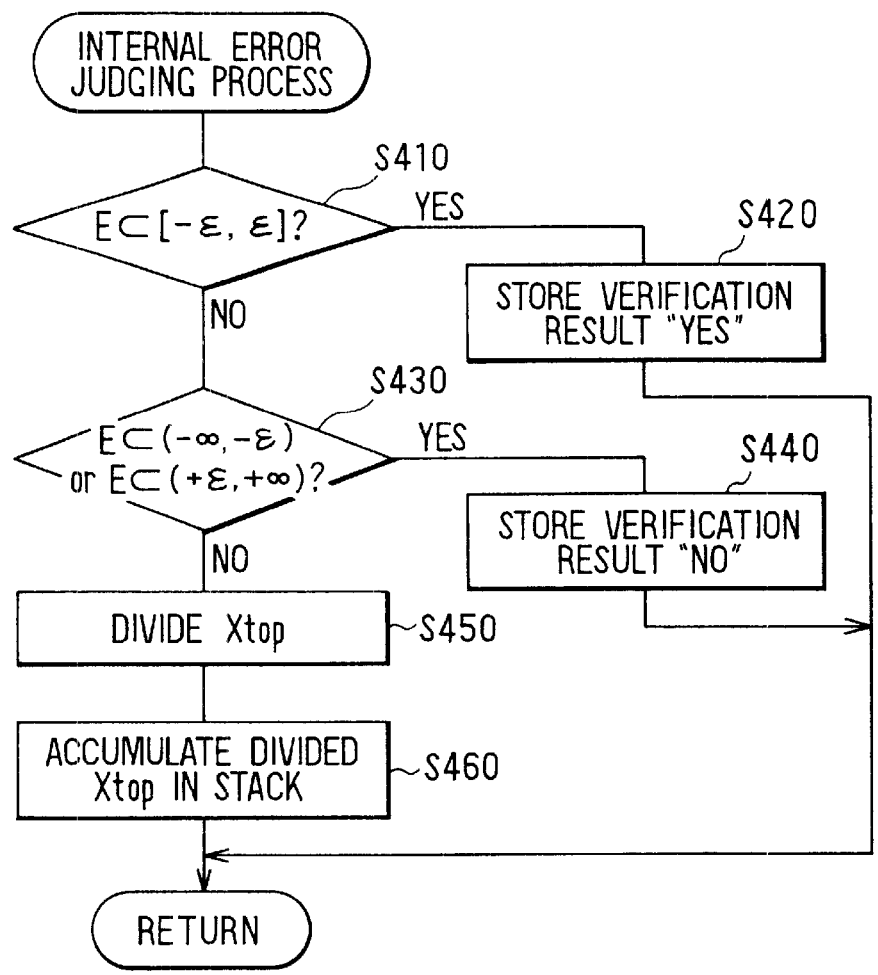
FIG. 6 is a flowchart detailing a process for judging an interval error executed in S200 in FIG. 2.

Here, this judging process will be explained in detail in reference to a flowchart shown in FIG. 6.

That is, when the CPU starts this process, it judges whether or not the whole interval error E is contained in the tolerance range [$-\epsilon, \epsilon$]. When it is judged to be YES, the CPU advances to S420 to set the verification result as "YES" and. to store the verification result to the verification result database DBO by tying with the interval input vector signal Xtop. Then, it ends the process.

When it is judged to be NO in S420 on the other hand, the CPU advances to S430 to judge whether or not the whole interval error E is contained in an open interval ($-\infty, -\epsilon$) or an open interval ($\epsilon, +\infty$), i.e., whether it is not contained in the tolerance range [$-\epsilon, \epsilon$] at all. Then, when it is judged to be YES, the CPU advances to S440 to set the verification result as "NO" and to store this verification result to the verification result database DBO by tying with the interval input vector signal Xtop. Then, it ends this process.

When it is judged to be NO also in S430, i.e., when only part of the interval error E is contained in the tolerance range [$-\epsilon, \epsilon$], it is judged to be "insufficiently divided". The CPU advances to S450 to divide the interval input vector signal Xtop and then to S460 to accumulate all of the newly divided and generated interval input vector signals $I_s$ to the stack. Then, it ends this process.

By the way, the process for dividing the interval input vector signal Xtop=$([x_1^L, x_1^U][x_2^L, x_2^U] \ldots [x_M^L, x_M^U])^t$ in S450 may be carried out by selecting either one interval element [$x_m^L, x_m^U$] (m=1 to M) and by dividing it into a two parts as shown in the following equations (29a) and (29b) by using its interior point $x_m^c \in [x_m^L, x_m^U]$ for example;

$$I_L = ([x_1^L, x_1^U] \ldots [x_m^L, x_m^c] \ldots [xM^L, xM^U])^t \quad (29a)$$
$$I_U = ([x_1^L, x_1^U] \ldots [x_m^c, x_m^U] \ldots [xM^L, xM^U])^t \quad (29b)$$

It is noted that although it is simple to set the interior point $x_m^c$ at the middle point (($x_m^L + x_m^U$)/2) of the interval element [$x_m^L, X_m^U$] for example, it may set at any point as long as it is set within the interval described above. It may be divided not only into two parts but also three or more parts. It is desirable to change the interval element to be selected per each division appropriately when the same interval input vector signal is to be repeatedly divided.

Next, returning to the flowchart in FIG. 2, the CPU judges whether or not the stack is empty in S210. When it is judged to be NO, i.e., when there remains the interval input vector signal $I_s$ to be processed in the stack, the CPU returns to S160 to repeatedly execute the processes from S160 to S210 until the stack becomes empty.

When it is judged to be YES in S210, i.e., when the process for judging the interval error has been finished for all of the interval input vector signals is accumulated in the stack, the CPU advances to S220 to display the recorded contents of the verification result database DBO on the display section 14 and finishes this process.

Next, the operation and effect of the verification method of the neural network of the present embodiment as described above will be explained with reference to the drawings.

According to the present embodiment, the neural network is verified by setting the range of each input signal inputted to the input layer respectively as one-dimensional input signal space, by dividing the m-(m is an integer equal to or greater than 1) dimensional input signal space to the input layer into a plurality of input signal subspaces and by judging the error between the network output signal and the teacher output signal per input signal subspace.

It is possible to verify the whole input signal space without omission by thus checking (judging the error) per each input signal subspace, not checking a certain point within the input signal space, unlike the check by means of test data.

Figure 14A:
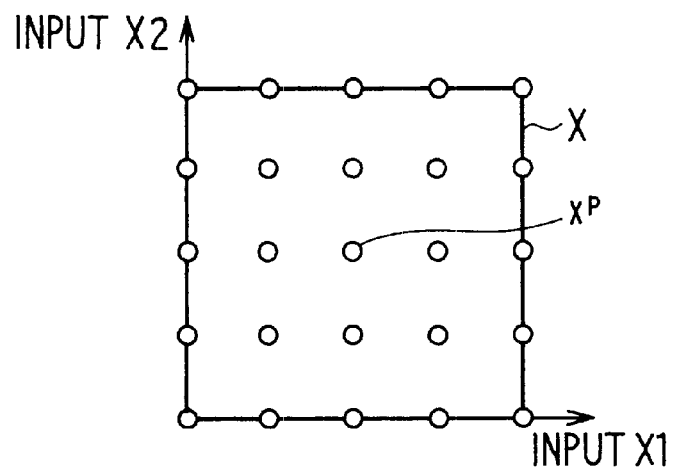
FIGS. 14A and 14B are charts showing the effects of the invention.
Figure 14B:
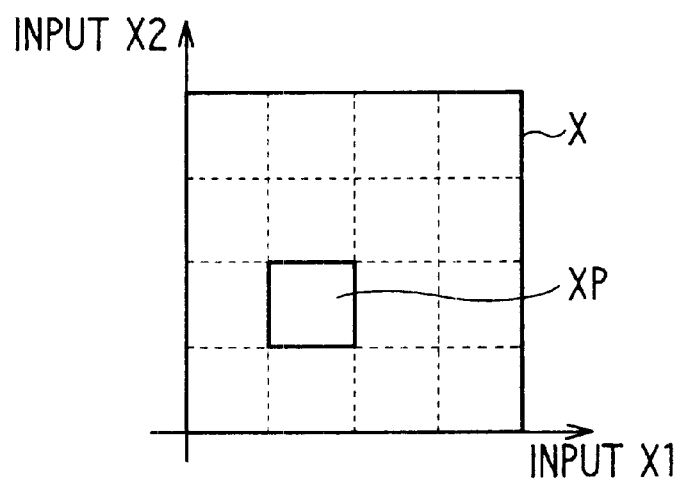

FIGS. 14A and 14B diagramatically show a two-dimensional input signal space X formed by two input signals $x_1 \in X_1$ and $x_2 \in X_2$, respectively. The present embodiment allows the input signal space X to be verified without omission because it checks not only a predetermined check point $x^p \in X$ (see FIG. 14A) but also each input signal subspace XP having a two-dimensional area, unlike the check by means of test data (see FIG. 14B).

It is noted that the error may be evaluated by calculating the interval error representing the obtainable range of the error between the teacher output signal and the network output signal and by judging the relationship of inclusion between the interval error and the tolerance which is the criterion of the judgment.

Figure 15A:
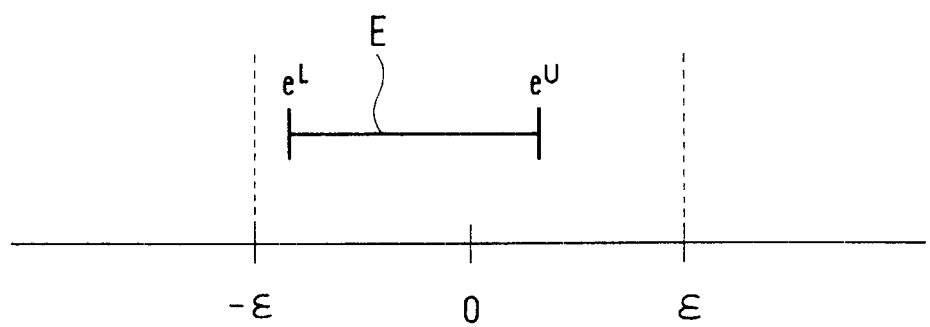
FIGS. 15A through 15C are graphs showing a judging method by means of interval error.

That is, because upper and lower bounds of the error when the neural network is operated by using all kinds of input signals (or combinations thereof) within the input signal subspace are contained in the interval error, the operation of the neural network is guaranteed for any input signals (or combinations thereof) contained in the input signal subspace when the interval error E=[$e^L, e^U$] is contained totally in the tolerance ($e^L \geq \epsilon$ and $e^U \leq \epsilon$) as shown in FIG. 15A.

Figure 15B:
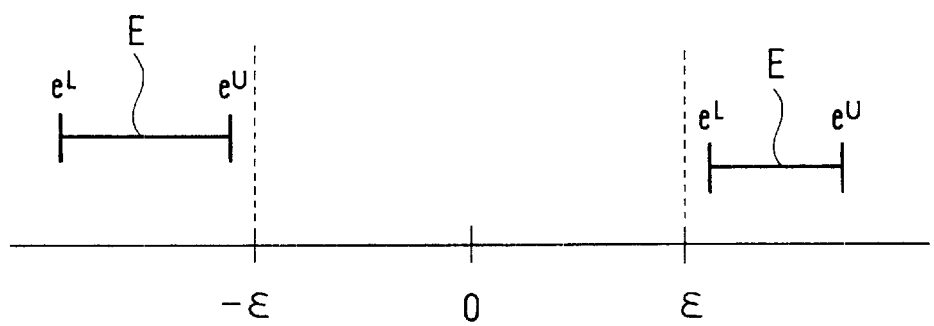

When the interval error E is not contained in the tolerance at all to the contrary as shown in FIG. 15B ($e^L > \epsilon$ or $e^U < -\epsilon$) it is apparent. that the operation is not guaranteed for any input. signals (or combinations thereof) contained in the input signal subspace. That is, it can be seen that the learning must be carried out again for the input signals (or combinations thereof) within such input signal subspace.

Figure 15C:
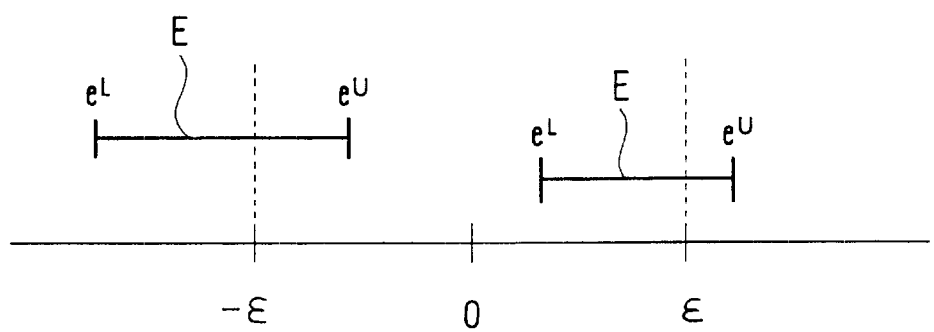

Then, in case other than those described above, i.e., parts of the interval error E are out of the tolerance and the others exist within the tolerance as shown in FIG. 15C, input signals that fit to the desirable operation of the neural network and those that do not exist mixedly among the input signals (or combinations thereof) in that input signal subspace.

Therefore, when it is judged that a part of the interval error is out of the tolerance, it is considered that the input signal subspace is insufficiently divided. Then, it is desirable to re-divide the input signal subspace into a plurality of input signal subspaces and to repeat the operation for judging the relationship of inclusion between the interval error and the tolerance per re-divided input signal subspace.

It allows the range of the input signal subspace which does not fit to the desirable operation of the neural network to be narrowed down and allows the learning to be implemented more effectively because the learning needs to be carried out in concentration only on the narrowed down input signal subspace in learning again.

Further, according to the present embodiment, the respective range of each input signal forming the input signal subspace is set as the interval input signal and the interval transmission signal representing an obtainable range of the transmission signal generated in each unit is calculated sequentially by using the interval arithmetic per each unit according to the signal transmitting process from the input layer to the output layer. Then, the interval transmission signal calculated per each unit of the output layer is set as an interval network output signal representing an obtainable range of the network output signal and the interval error is calculated based on this interval network output signal.

Here, when an interval of variables which assume an upper bound $\alpha$ and a lower bound $\beta$ is represented by $[\alpha, \beta]$, the interval arithmetic is what the four fundamental operations of arithmetic with respect to the two intervals $X=[x^L, x^U]$ and $Y=[y^L, y^U]$ are defined by the following equations (1) through (4b):

$$X+Y=[x^L+y^L, x^U+y^U] \quad (1)$$

$$X-Y=[x^L-y^L, x^U-y^U] \quad (2)$$

$$X \cdot Y=[\min(x^Ly^L, x^Ly^U, x^Uy^L, x^Uy^U), \max(x^Ly^L, x^Ly^U, x^Uy^L, x^Uy^U)] \quad (3)$$

$$X \cdot Y = [\min(x^Ly^L, x^Ly^U, x^Uy^L, x^Uy^U), \max(x^Ly^L, x^Ly^U, x^Uy^L, x^Uy^U)] \quad (3)$$

$$X/Y = X \cdot (1/Y) \quad (4)$$

$$= X \cdot [1/y^U, 1/y^L] \; (y^L > 0 \text{ OR } y^U < 0) \quad (4a)$$

$$= X \cdot [1/y^L, 1/y^U] \; (y^L < 0 \text{ AND } y^U > 0) \quad (4b)$$

It is noted that a real number a is considered as an interval [a, a] whose width is zero, a multiplication of the real number a with the interval X is defined by the following equations (5a) and (5b) and a width of the interval X (hereinafter referred to as an interval width) w(X) is defined by the following equation (6):

$$a \cdot X = [a \cdot x^L, a \cdot x^U] \; (a \geq 0) \quad (5a)$$

$$= [a \cdot x^U, a \cdot x^L] \; (a < 0) \quad (5b)$$

$$w(X) = x^U - x^L \quad (6)$$

$$w(X)=x^U-x^L \quad (6)$$

For instance, when a function $h(x)=x^2-x$ is set and when the variable x is $0 \leq x \leq 1$ (i.e., the interval $X=[0, 1]$, $x \in X$), an actually obtainable value of the function h(x) with respect to the variable x within the interval X turns out to be $-\frac{1}{4} \leq h(x) \leq 0$. When the interval arithmetic is carried out by replacing the variable x with the interval X, it turns out as follows:

$$h(X)=X-X^2=[0, 1]-[0, 1]^2=[0, 1]-[0, 1]=[-1, 1]$$

That is, because $[-\frac{1}{4}, 0] \subset [-1, 1]$, it can be seen that h(x) E h(X) holds with respect to any x E X and the interval arithmetic h(X) gives the upper and lower bounds in the interval X of the function h(x).

Because the interval arithmetic is described in detail in R. Baker Kearfott, "Rigourous Global Search: Continuous Problem", KLUWER ACADEMIC PUBLISHERS (1996) (hereinafter referred to as a first document), its further explanation will be omitted here.

That is, the use of the interval arithmetic allows the upper and lower bounds of the transmission signal (i.e., the interval transmission signal) generated by each unit from the interval input signal to be found and the upper and lower bounds of the error between the network output signal and the teacher output signal to be also actually found.

It is noted that S130 corresponds to interval dividing means, S170 to interval teacher output signal calculating means, S180 to interval error calculating means, S190 to interval error calculating means, S200 to judging means, S450 to interval re-dividing means and S310 to S360 to interval transmission signal calculating means.

As described above, the neural network verification apparatus 2 of the present embodiment judges the error by dividing the M-dimensional input signal space X into the input signal subspaces XP (interval input vector signals xtop), by calculating the interval error E (=e(Xtop)) representing the error between the interval network output signal n(Xtop) containing the upper and lower bounds of the network output signal n(x) and the interval teacher output signal t(Xtop) by using the interval arithmetic per input signal subspace XP and by comparing the interval error E with the range of tolerance $[-\epsilon, \epsilon]$.

Because the neural network verification apparatus 2 of the present embodiment thus verifies all input signals (or combinations thereof) belonging to the input signal subspace XP altogether by using the interval arithmetic, it can verify in a short time as compared to the conventional case of verifying each individual input signal by test data. Still more, because it can be applied to a case when the input signal assumes not a discrete value but a continuous value in which points to be verified exist infinitely, so that the operation of the neural network NET may be guaranteed reliably for all input signals (or combinations thereof) belonging to the input signal space X.

Further, when the verification result of the interval input vector signal Xtop is "insufficiently divided", the neural network verification apparatus 2 of the present embodiment re-divides the interval input vector signal Xtop, accumulates them in the stack and executes the verification process again per re-divided interval input vector signal.

Accordingly, it allows the learning to be efficiently carried out in learning the neural network NET again because it allows the range of the interval input vector signal $I_s$ whose verification result is "NO" to be narrowed down and allows the points where teacher data should be increased to be known precisely. By the way, when the neural network NET is used by incorporating to an equipment after its verification and when the calculation of the neural network NET is executed by a fixed-point arithmetic CPU, the accuracy of the calculation changes depending on the position of decimal point.

However, according to the neural network verification apparatus 2 of the present embodiment, the upper and lower bounds of calculated values appearing in the process are clarified by the interval arithmetic, so that the position of the decimal point may be determined so that the required least bit number is assigned to the integer section. Because it allows the CPU to thus execute the calculation accurately, it can bring about the capability of the neural network NET to the maximum.

It is noted that although the hierarchical model has been used as the neural network in the embodiment described above, another model may be used as long as it allows the upper and lower bounds of the neural network output signal to be calculated.

Second Embodiment

Next, a second embodiment of the invention will be explained.

Figure 7:
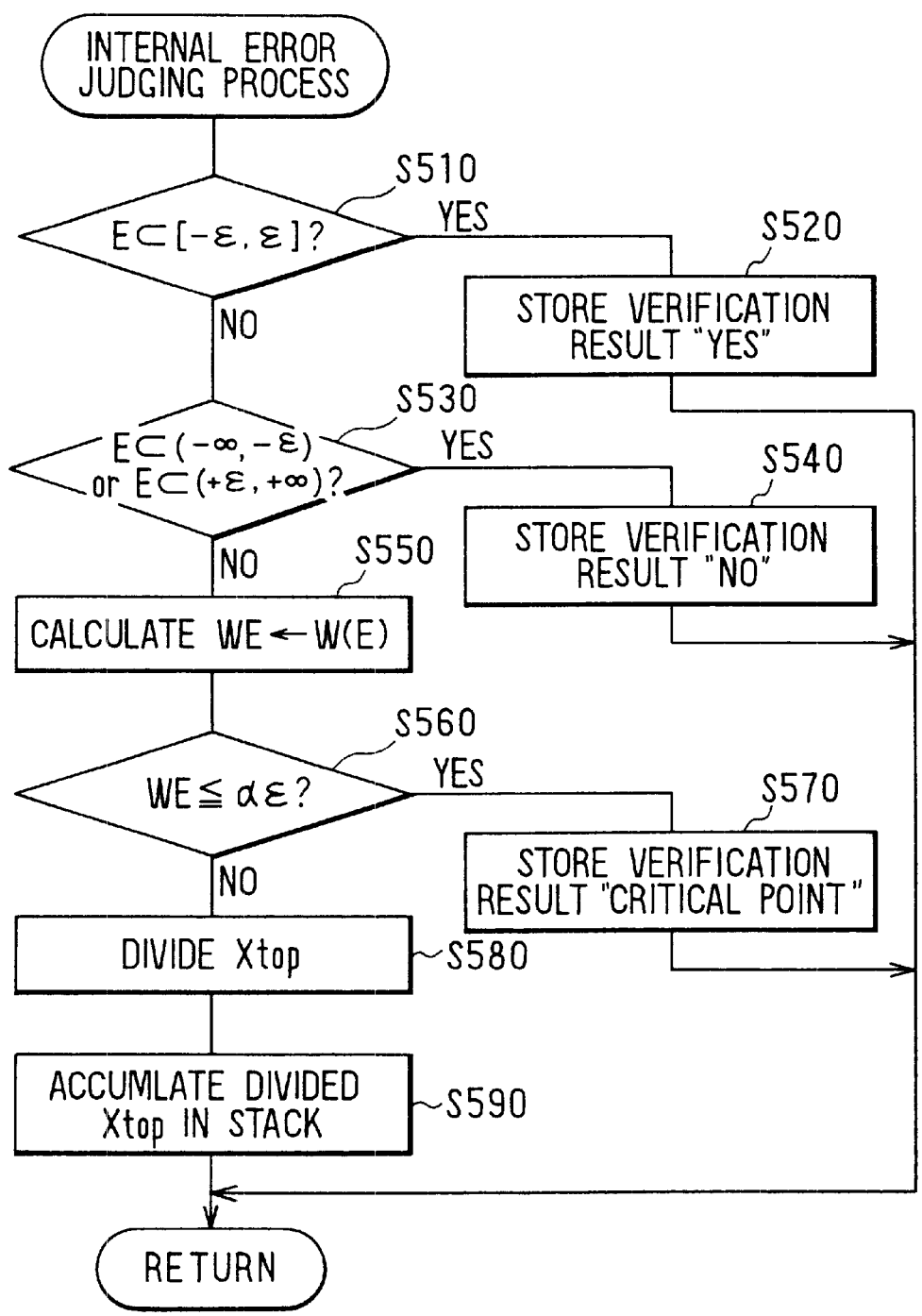
FIG. 7 is a flowchart showing a process for judging an interval error according to a second embodiment.

A neural network verification apparatus of the present embodiment is totally the same as that of the first embodiment with regard to the structure and process except with regard to a part of the processing contents of the process for judging the interval error executed in S200, so that only the process for judging the interval error will be explained below in reference to a flowchart shown in FIG. 7.

When the CPU starts this process and when the whole interval error $E=e(Xtop)=[e^L, e^U]$ is contained in the tolerance range $[-\epsilon,\epsilon]$, the CPU sets the verification result as "YES" and stores the verification result to the verification result database DBO (S510-YES, S520) by tying with the interval input vector signal Xtop in S510 through S540 totally in the same manner with S410 through S440 in the first embodiment. Then, it ends the process. When the whole interval error E is not contained in the tolerance range $[-\epsilon, \epsilon]$ at all on the other hand, the CPU sets the verification result as "NO" and stores this verification result to the verification result database DBO (S510-YES, S530-YES, S540) by tying it with the interval input vector signal Xtop. Then, it ends this process. In case other than those described above (S530-NO), the CPU advances to S550.

In S550, the CPU calculates an interval error width WE of the interval error E by the following equation (30) and judges in S560 whether or not this interval error width WE is smaller than a preset limit value $\alpha\epsilon$ ($0<\alpha<1$):

$$WE=W(e(Xtop))=e^U-e^L \quad (30)$$

When it is judged to be YES in S560, the CPU advances to S570 to set the verification result as "Critical Point" to show that the critical point is contained in the interval input vector signal Xtop and stores this verification result to the verification result database DBO by tying with the interval input vector signal Xtop. It then ends this process.

When it is judged to be NO in S560 on the other hand, the CPU considers as "insufficiently divided" and advances to S580 to divide the interval input vector signal Xtop in S580 and to accumulate the divided and generated interval input vector signals $I^L$ and $I^U$ in the stack in S590 similarly to S450 and S460 in the first embodiment. It then ends this process.

The operation and effect of the present embodiment will be explained by using the drawings.

Figure 16:
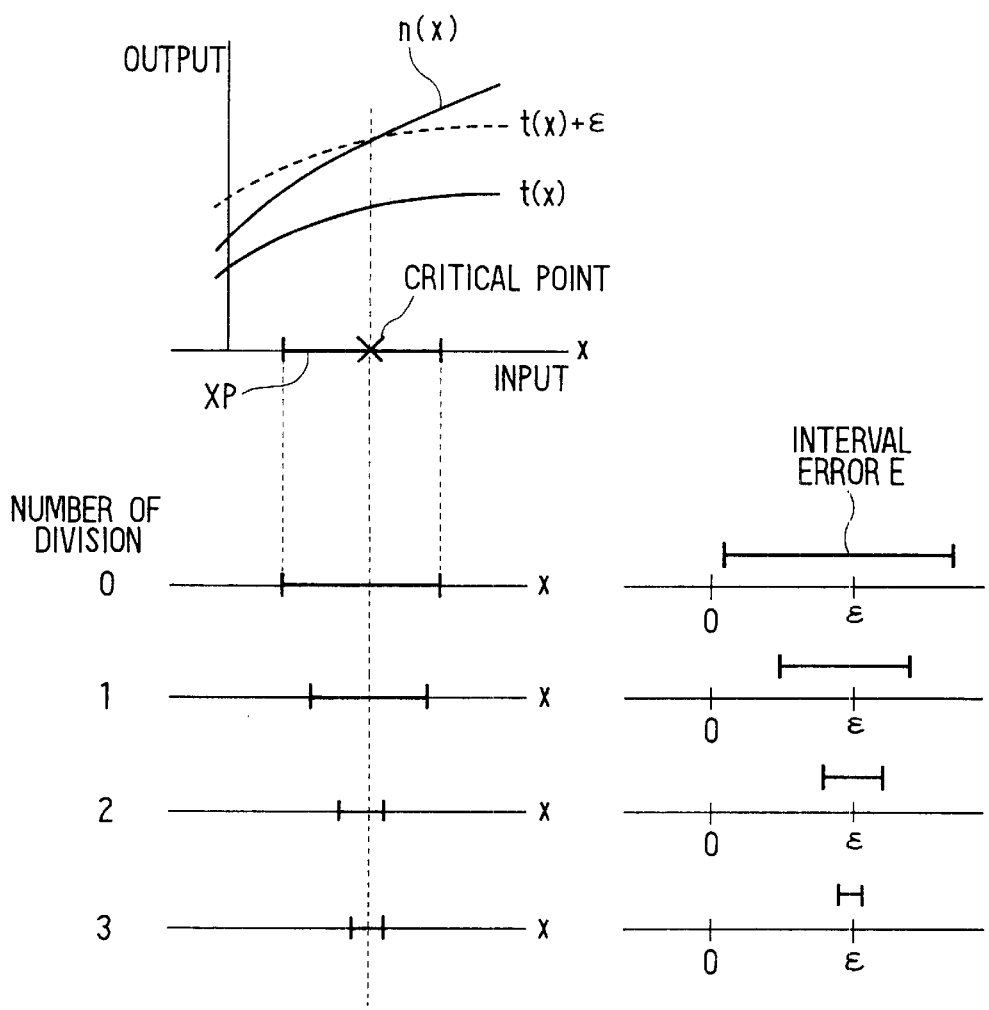
FIG. 16 is a graph showing the relationship between an interval error and a critical point.

When there is a point which is slightly greater than a point (called a critical point) where the error between the network output signal $n(x)$ and the teacher output signal $t(x)$ becomes equal to a boundary value of the tolerance ($|n(x)-t(x)|=\epsilon$) within the input signal subspace XP as shown in FIG. 16, it is judged to be insufficiently divided in the first embodiment and the input signal subspace is re-divided. Then, while the interval error E becomes small in the input signal subspace generated by this re-dividing process, the critical point is always contained in either one of the input signal subspace. As a result, there is a possibility that it leads a drop of calculating speed, because the re-dividing process is repeatedly carried out in the input signal subspace containing the critical point and an amount of calculation increases.

Then, according to the present embodiment, the re-dividing process of the input signal subspace is inhibited even if it is judged that part of the interval error is out of the tolerance, when the width of the interval error is equal to or smaller than the limit width, which is smaller than the width of the tolerance. It is possible to decide the upper bound of the number of times of re-division in advance as a method for inhibiting the re-division. Here, S550 and S560 correspond to re-division inhibiting means in this process.

Thus, the present embodiment can prevent the interval input vector signal Xtop containing the critical point from being unnecessarily and repeatedly divided and can reliably prevent the processing speed from dropping in the end because it inhibits to re-divide the interval input vector signal Xtop further by considering that the interval error E contains the critical value if the interval error width WE is equal to or less than the limit value $\alpha\epsilon$ when the verification result is not "YES" nor "NO".

Third Embodiment

Next, a third embodiment of the invention will be explained.

The structure and processes of a neural network verification apparatus of the this embodiment are totally the same as those of the first and second embodiments except of the processing contents of the process for calculating the interval network output signal executed in S180, so that only this process for calculating the interval network output signal will be explained along a flowchart shown in FIG. 8.

When the CPU starts this process, it calculates the center point $x^c=(x_1^c, x_2^c \ldots x_M^c)^t$ of the interval input vector signal $Xtop=([X_1^L, X_1^U][X_2^L, X_2^U] \ldots [X_M^L, X_M^U])t$ by the following equation (31):

$$X_m^c=(x_m^L+x_m^U)/2 \quad (m=1, 2, \ldots, M) \quad (31)$$

In S620, the CPU calculates a weighting signal $net_j$ for this center point $x^c$ about all units $U_j$ composing the neural network NET.

Figure 5:
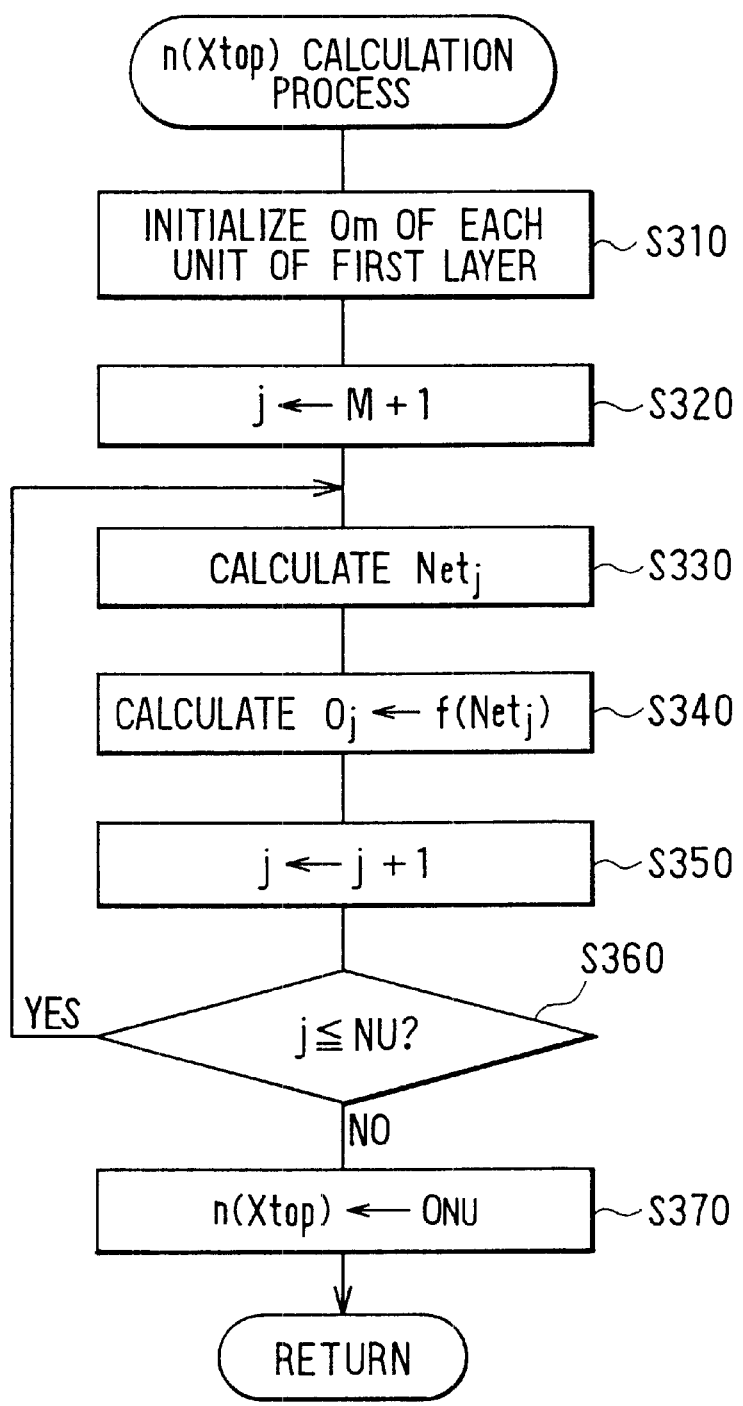
FIG. 5 is a flowchart detailing a process for calculating an interval network output signal executed in S180 in FIG. 2.

In concrete, it may be calculated by the same procedure with the process for calculating the interval network output signal shown in FIG. 5. However, the value calculated in S330 may be used by executing the process not by the interval arithmetic but by the ordinary operation by using the center point $X^c$, the transmission signal $O_j$ and the weighting signal $net_j$, instead of the interval input vector signal Xtop, the interval transmission signal $O_j$ and the interval weighting signal $Net_j$. It is noted that the weighting signal in the unit $U_j$ calculated by the process of this step will be denoted as '$net_j^c$' hereinafter.

Then in S630, the CPU initializes the interval transmission signal $O_m$ of each unit $U_m$ ($m=1, 2, \ldots M$) of the input layer totally in the same manner with S300 in the first embodiment. That is, the CPU sets each interval element $XP_m$ of the interval input vector signal Xtop as the interval transmission signal $O_m$ as it is.

In S640, the CPU initializes an inclination $\Phi O_m/\Phi XP_n$ of the transmission signal $O_m$ ($m=1, 2, \ldots M$) with respect to each interval element $XP_n$ (n=1, 2, . . . M) per each unit $U_m$ of the input layer in accordance to the following equation (32):

$$\frac{\Phi O_n}{\Phi XP_n} = \begin{cases} [1, 1] & n = m \\ [0, 0] & n \neq m \end{cases} \quad (32)$$

The CPU initializes the inclination because only the interval element $XP_m$ is inputted to the unit $U_m$ of the input layer and the transmission signal $O_m$ of the unit $U_m$ is decided solely by the interval element $XP_m$ regardless of the other interval element $XP_n$ where m≠n.

It is noted that this inclination $\Phi O_m/\Phi XP_n$ corresponds to a second inclination in the invention.

In S650 and S660, the CPU calculates the interval weighting signal Net. for the unit $U_j$ (S660) after setting the counter j at M+1 (S650) in the same manner as S320 and S330 in the first embodiment. Here, the interval weighting signal calculated in S660 is set as a first interval $Net_j\_1$.

In S670, the CPU calculates an inclination $\Phi net_j/\Phi XP_m$ of the weighting signal $net_j$ for the interval element $XP_m$ per interval element $XP_m$ (m=1, 2, . . . M) about the same unit $U_j$ in accordance to the following equation (33). The element thereof will be denoted by the following equation (34) hereinbelow:

$$\frac{\Phi net_j}{\Phi XP_m} = \sum_{k \in C(j)} \omega_{jk} \frac{\Phi O_k}{\Phi XP_m} \quad (33)$$

$$\frac{\Phi net_j}{\Phi XP_m} = [snet_j^U, snet_j^L] \quad (34)$$

It is noted that this inclination $\Phi net_j/\Phi XP_n$ corresponds to a first inclination in the invention.

Based on the inclination $\Phi net_j/\Phi XP_m$ obtained in S670, the CPU calculates the interval weighting signal $Net_j$ of the unit $U_j$ in S680. Here, the interval weighting signal calculated in this step will be denoted as a second interval $Net_j\_2$.

That is, the CPU calculates a semi-interval width W by the following equation (35) and sets an interval represented by the following equation (36) as the second interval $Net_j\_2$ by using the semi-interval width W and the weighting signal $net_j^c$ for the center point $x^c$ calculated in S620:

$$W = \sum_{m=1}^{M} \frac{\Phi net_j}{\Phi XP_m} * (XP_m - x_m^C) \quad (35)$$

$$Net_j\_2 = [net_j^c - W, net_j^c + W] \quad (36)$$

Then, based on the first interval $Net_j\_1$ found in S660 and the second interval $Net_j\_2$ found in S680, the CPU sets the interval common to both as the interval weighting signal $Net_j$ of the unit $U_j$.

That is, when $Net_j\_1 = [net1^L, net1^U]$ and $Net_j\_2 = [net2^L, net2^U]$ the interval weighting signal $Net_j$ may be expressed by the following equation (37):

$$Net_j = Net_j\_1 \cap Net_j\_2 \quad (37)$$

$$= [\max(net1^L, net2^L), \min(net1^U, net2^U)]$$

In S700, the CPU calculates the interval transmission signal $O_j$ of the unit $U_j$ for the interval input vector signal Xtop in the same manner as S340 in the first embodiment by using the interval weighting signal $Net_j$ found in S690.

In S710, the CPU judges whether or not the value of the counter j is smaller than the total number of the units NU in the neural network NET and when it is judged to be YES, advances to S720 by assuming that the unit $U_j$ presently being processed is what composes the intermediate layer (second to NL-1 layer). In S720, the CPU calculates an inclination $\Phi f/\Phi Net_j$ of the output function f(x) with respect to the interval weighting signal $Net_j$ found in S690. It is noted that this inclination ($\Phi f/\Phi Net_j$ corresponds to a third inclination of the invention.

Figure 9:
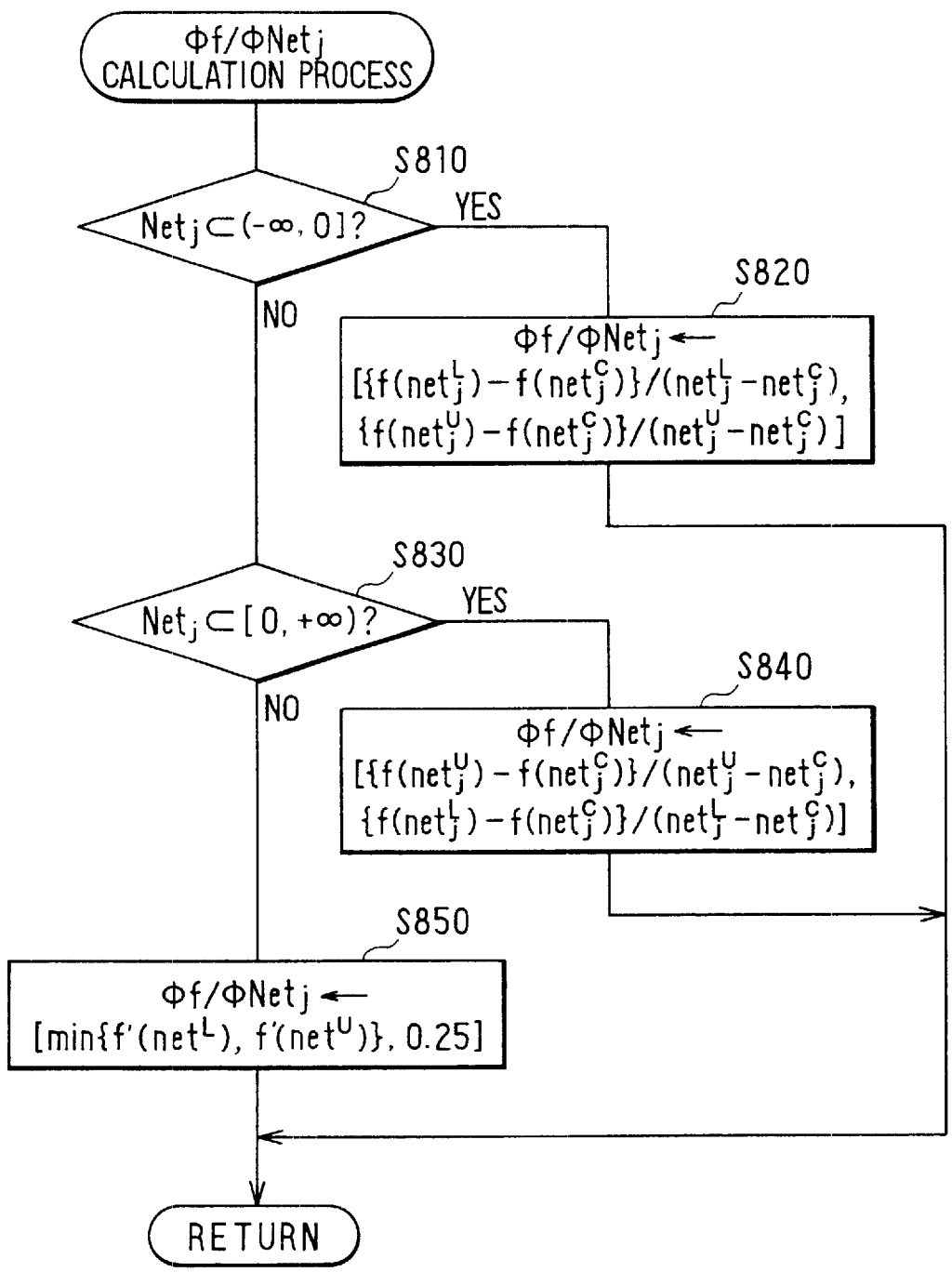
FIG. 9 is a flowchart detailing a process for calculating an inclination executed in S720 in FIG. 8.

Here, the process for calculating the inclination $\Phi f/\Phi Net_j$ will be explained in detail in reference to a flowchart shown in FIG. 9.

That is, when the CPU starts this process, it judges in S810 at first whether or not the whole range of the interval weighting signal $Net_j$ found previously in S690 is contained in an interval $[-\infty, 0]$ where the output function (sigmoid function) f(x) is convex downward. When it is judged to be YES, the CPU advances to S820 to set the inclination $\Phi f/\Phi Net_j$ in accordance to the following equation (38) and ends this process.

$$\frac{\Phi f}{\Phi Net_j} = \left[ \frac{f(net_j^L) - f(net_j^C)}{net_j^L - net_j^C}, \frac{f(net_j^U) - f(net_j^C)}{net_j^U - net_j^C} \right] \quad (38)$$

When it is judged to be NO in S810 on the other hand, the CPU advances to S830 to judge whether or not the whole range of the interval weighting signal $Net_j$ is contained in an interval $[0, +\infty)$ where the output function f(x) is convex upward. When it is judged to be YES, the CPU advances to S840 to set the inclination $\Phi f/\Phi Net_j$ in accordance to the following equation (39) and ends this process.

$$\frac{\Phi f}{\Phi Net_j} = \left[ \frac{f(net_j^U) - f(net_j^C)}{net_j^U - net_j^C}, \frac{f(net_j^L) - f(net_j^C)}{net_j^L - net_j^C} \right] \quad (39)$$

When it is judged to be NO also. in S830, the CPU advances to S850 to set the inclination $\Phi f/\Phi Net_j$ in accordance to the following equation (40) and ends this process because the interval weighting signal $Net_j$ exits across both intervals where the output function f(x) is convex upward and downward, i.e., the interval straddling zero where the derivative f'(x) is maximum.

$$\frac{\Phi f}{\Phi Net_j} = [\min(f'(net_j^L), f'(net_j^U)), 0.25] \quad (40)$$

The inclination $\Phi f/\Phi Net_j$ found in S720 will be expressed by the following equation (41) hereinbelow:

$$\frac{\Phi f}{\Phi Net_j} = [sf_j^L, sf_j^U] \quad (41)$$

Figure 8:
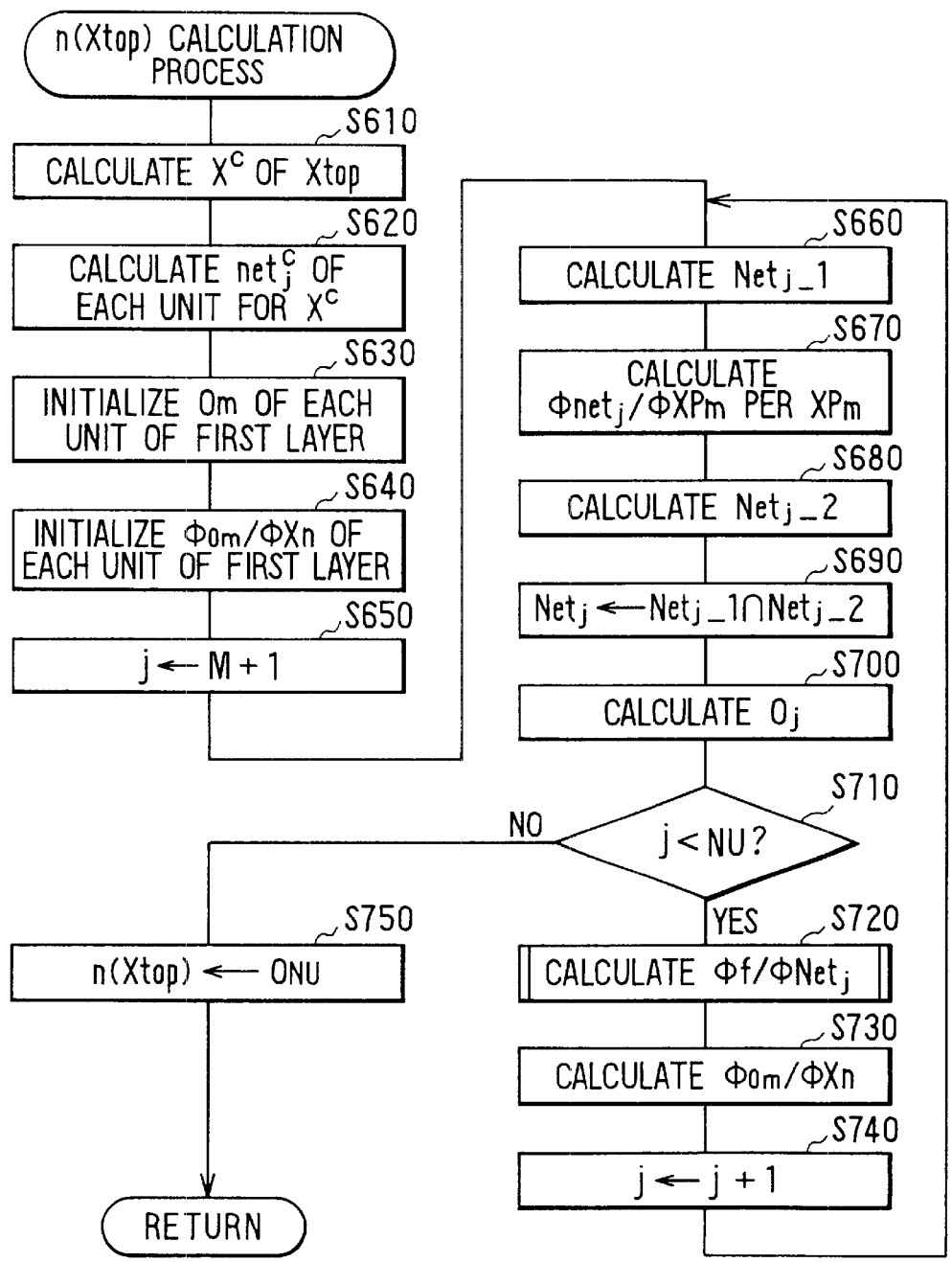
FIG. 8 is a flowchart showing a process for calculating an interval network output signal according to a third embodiment.

Next, returning to the flowchart shown in FIG. 8, the CPU calculates an inclination $\Phi O_j/\Phi XP_m$ (corresponds to the second inclination of the invention) of the transmission function $O_j$ of the unit $U_j$ with respect to the interval element $XP_m$ per each interval element $XP_m$ (m=1, 2, . . . M) in S730.

That is, the CPU calculates it. by using the inclination $\Phi net_j/\Phi XP_m$ calculated in S670 and the inclination $\Phi f/\Phi Net_j$ calculated in S720 in accordance to the following equation (42):

$$\frac{\Phi O_j}{\Phi XP_m} = \frac{\Phi f}{\Phi Net_j} \cdot \frac{\Phi net_j}{\Phi XP_m} = [sf_j^L, sf_j^U] \cdot [snet_j^L, snet_j^U] \quad (42)$$

In S740; the CPU returns to S660 to implement a process for the next unit $U_j$ after incrementing the counter j.

When it is judged to be NO in S710 on the other hand, the CPU shifts to S750 by supposing that the process has been finished for all of the units $U_j$ to set the unit $U_{NU}$ of the output layer as the network output signal n(Xtop) with respect to the interval input vector signal Xtop and to end this process.

The operation and effect of the present embodiment will be explained below by using the drawings.

As it is apparent also from the example shown in the second embodiment, while the interval arithmetic h(X) in the interval X of the function h(x) contains a true range in the interval X of the function h(x), the range of the function may not always be calculated accurately because the interval width is widened in general.

Then, when the interval error is too large as compared to the upper and lower bounds of the actual error, there is a case when it is judged to be 'insufficiently divided' and when re-division and re-evaluation which are not originally required are carried out, thus increasing the calculation time, even if the network output signal is actually within the tolerance of the error.

Then, according to the verification method of the neural network of the present embodiment, the unit of the input layer outputs the input signal as the transmission signal as it is. Then, the units in the intermediate and output layers generate a weighting signal based on all transmission signals inputted from the units of the previous stage and synaptic weight corresponding respectively to the transmission signal. An intersection of a first interval signal obtained based on a sum of products of the interval transmission signal inputted from the previous unit and the synaptic weight and a second interval signal obtained based on a sum of products of the first inclination representing the range of an obtainable rate of change of the weighting signal with respect to the interval input signal and the interval input signal, is found for the units of the intermediate and output layers in generating the transmission signal to be outputted to the following stage by the predetermined output function to which the weighting signal is to be inputted. Then, that intersection is set as the interval weighting signal representing the obtainable range of the weighting signal with respect to the interval input signal. The interval transmission signal is generated based on this interval weighting signal and the output function.

That is, the interval weighting signal is found by two different kinds of methods and is made closer to actual one by finding their intersection.

The inclination used to find the second interval signal here is a known technology which is used in the first document with a term of "slope" and is detailed therein, so that only the outline thereof will be explained here.

That is, supposing about the function h(x) that an interval of its variable x is $X=[X^L, x^U]$ and an arbitrary interior point as $x^c$ and that there exist two straight lines U(x) and L(x) which pass through the interior point $x^c$ and pinch the function h(x) within the interval X, they are expressed by the following equations (7) and (8):

$$U(x)=s^U \cdot (x-x^c)+h(x^c) \quad (7)$$

$$L(x)=s^L \cdot (x-x^c)+h(x^c) \quad (8)$$

Figure 17:
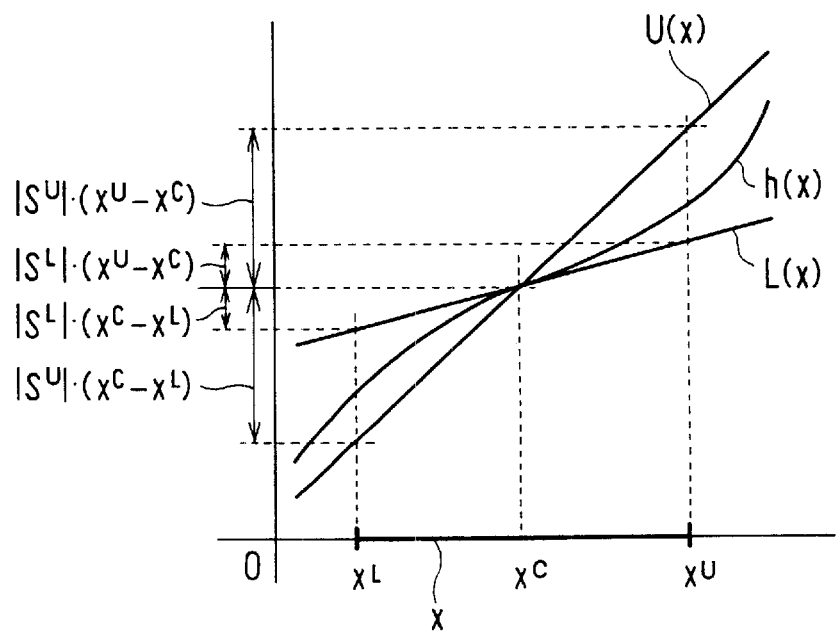
FIG. 17 is a graph showing a definition of an inclination.

Where, $s^U$ and $s^L$ are constants defined by the interval X and when $s^U > s^L$, those lines are expressed as follows as shown in FIG. 17:

$$L(x) \leq h(x) \leq U(x)(x \geq x^c) \quad (9)$$

$$U(x) \leq h(x) \leq U(x)(x < x^c) \quad (10)$$

When the semi-interval width W of the obtainable range of h(x) with respect to the interval x is defined by the following equation (11), the relationship of the following equation (12) holds in the interval X:

$$W=\max(|s^L|, |s^U|) \cdot \max(x^U-x^c, x^c-x^L) \quad (11)$$

$$h(x^c)-W \leq h(x) \leq h(x^c)+W \quad (12)$$

That is, the obtainable range of the function h(x) with respect to the interval X turns out as follows:

$$h(X)=[h(x^c)-W, h(x^c)+W] \quad (13)$$

Then, the inclination of the function h(x) with respect to the interval X at this time is defined by the following equation (14):

$$\frac{\Phi h}{\Phi X} = [s^L, s^U] \quad (14)$$

When the interval $X=[x^L, x^U]$, the interior point $x_c$, and the inclination $\Phi h/\Phi X$ are given an operator for finding the semi-interval width W will be denoted by * hereinafter. That is, the operator * is defined by the following equation (15):

$$\frac{\Phi h}{\Phi X} *(X-x^c) = \max(|s^L|, |s^U|) \cdot \max(x^U-x^C, x^C-x^L) \quad (15)$$

Although the above explanation has been given by using the mono-variable function to facilitate understanding of the invention, the similar inclination may be defined per element of each interval vector also for m-dimensional multi-variable function $h(x)=h(x_1, x_2, \ldots, x_m)$, the interval vector $X=(X_1, X_2, \ldots, X_m)^t$ and the interior point $x^c=(x_1^c, x_2^c, \ldots, x_m^c)^t \in X$ and the semi-interval width W may be found by the following equation (17) by using this inclination:

$$\frac{\Phi h}{\Phi X_n} = [s_m^L, s_m^U] \quad (m=1, 2, \ldots, M) \quad (16)$$

$$W = \sum_{n=1}^{M} \frac{\Phi h}{\Phi X_m} *(X_m - x_m^c) \quad (17)$$

By the way, the first inclination representing the range of the obtainable rate of change of the weighting signal with respect to the interval input signal may be calculated by a sum of products of the second inclination representing the range of the obtainable rate of change of the transmission signal inputted from the unit of the previous stage with respect to the interval input signal and the synaptic weight, and the second inclination of the transmission signal outputted to the following stage may be calculated by a product of the third inclination representing an obtainable range of the inclination of the output function with respect to the weighting signal and the first inclination.

Then, when the output function f(x) is a sigmoid function or a hyperbolic function and when a derivative of the output function f(x) is set as f'(x), the interval weighting signal as [NL, NU] and its interior point as NC, the third inclination may be set as [{f(NL)−f(NC)}/{NL−NC}, {f(NU)−f(NC)}/{NU−NC}]. when NU<0, [{f(NU)−f(NC)}/{NU−NC}, {f(NL)−f(NC)}/{NL−NC}] when NL≧0 and as [min{f'(NL), f'(NU)}, f'(0)] in case other than those described above.

Figure 18:
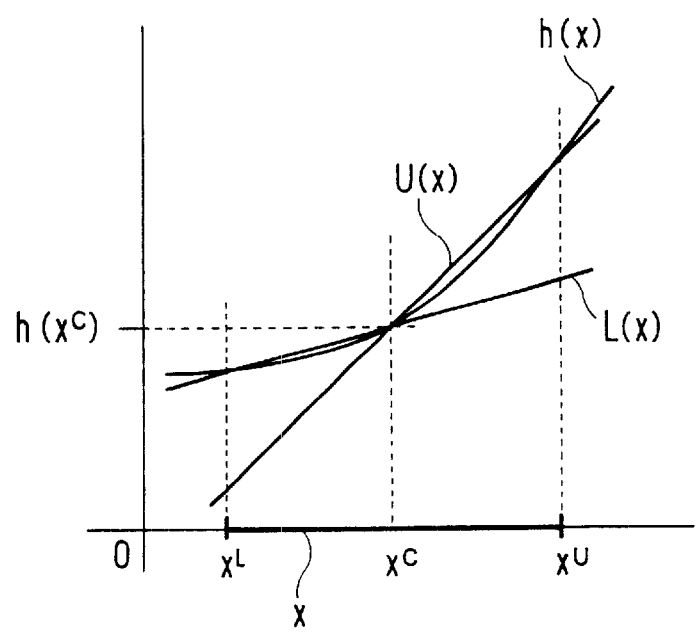
FIG. 18 is a graph showing a method for calculating the inclination in a function, which is convex downward.

That is, it has been known that the following items (1) and (2) hold in finding an inclination $\Phi h/\Phi X$ of the arbitrate function h(x) in the interval X=[$x^L$, $x^L$]:

(1) $\Phi h/\Phi X$ may be set as [$g^L$, $g^U$] when the function h(x) increases monotonously (h'(x)>0) or decreases monotonously (h'(x)<0) in the interval X and the upper and lower bounds of the derivative h'(x) of the function h(x) in the interval X are given by $g^L$, $g^U$ and (2) The inclination $\Phi h/\Phi X = [s^L, s^U]$ may be given from the following equations (18) and (19) when the function h(x) is convex upward (h''(x)>0) or downward (h''(x)<0) in the interval X as it is apparent from FIG. 18 (which shows the case when it is convex downward). Where, the interior point of the interval x is denoted as $x^c$.

$$s^L = \min\left(\frac{h(x^L) - h(x^C)}{x^L - x^C}, \frac{h(x^U) - h(x^C)}{x^U - x^C}\right) \quad (18)$$

$$s^U = \max\left(\frac{h(x^L) - h(x^C)}{x^L - x^C}, \frac{h(x^U) - h(x^C)}{x^U - x^C}\right) \quad (19)$$

Figure 19A:
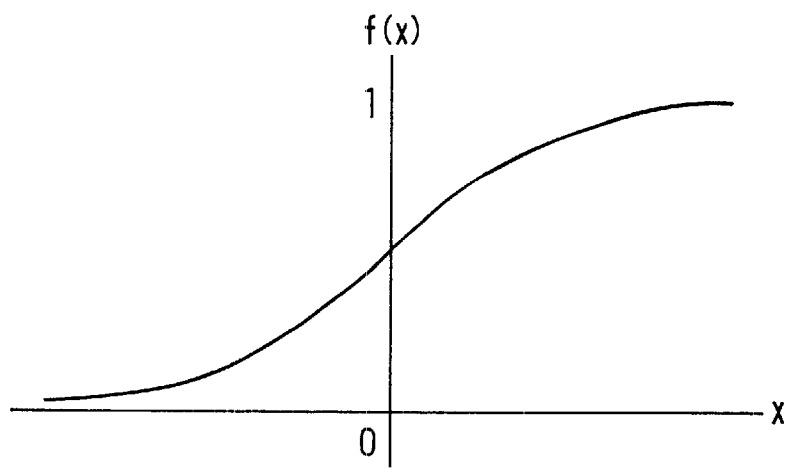
FIG. 19A is a graph showing a sigmoid function.
Figure 19B:
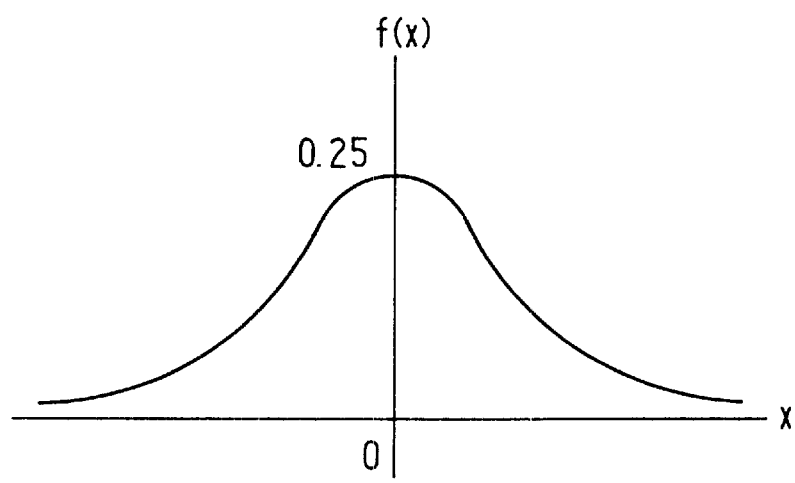
FIG. 19B is a graph showing a derivative of the sigmoid function in FIG. 19A.

Then, the sigmoid function f(x)=1/{1+exp(−x)} and the hyperbolic function f(x)=tanh(x) used as the output function are both monotone increase functions as shown in FIGS. 19A and 19B and have characteristics that they are convex upward when x≧0 and convex downward when x<0 and that the derivative f'(x) takes the maximum value when x=0. It is noted that while FIG. 19A shows the sigmoid function f(x) and FIG. 19B shows a graph of the derivative f'(x), the hyperbolic function is also represented by similar graphs.

Therefore, the inclination of the output function with respect to the interval weighting signal may be found by using the second characteristic described above when the interval weighting signal does not straddle x=0, and by using the first characteristic described above when the interval weighting signal straddles x=0.

Thus, the present embodiment allows the calculation time to be shortened because it allows the inclination of the output function to be found readily.

It is noted that in the above-mentioned processes, S610 to S740 corresponds to interval transmission signal calculating means, S660 to first interval signal calculating means, S680 to second interval signal calculating means, S690 to intersection extraction means, S700 to interval transmission signal generating means, S670 to first inclination calculating means, S730 to second inclination calculating means and S720 to third inclination setting means.

Concrete exemplary calculation of the processes will be shown in the column of the second exemplary calculation described later in order to facilitate understanding of the processing contents of these processes.

As described above, the neural network verification apparatus of the present embodiment narrows down the interval weighting signal $Net_j$ so that it becomes closer to the actual obtainable range of the weighting signal $net_j$ by calculating it by two kinds of methods and by using their intersection.

Accordingly, the neural network verification apparatus of the present embodiment allows a number of times of unnecessary re-division of the interval input vector signal Xtop to be reduced and the verification to be completed in a shorter time based on that the interval error E is calculated to be larger than the range from the upper bound to the lower bound of the actual error because the interval error E is calculated more accurately.

Still more, the present embodiment allows the amount of calculation to be reduced and the processing time to be shortened because the inclination $\Phi f/\Phi Net_j$ of the output function f(x) for the interval weighting signal $Net_j$ is set by utilizing the feature of the output function f(x), i.e., it is a monotone increase function and that the derivative f'(x) becomes maximum at x=0.

It is noted that the neural network verification method of the first through third embodiments described above may be realized by a program executed by a computer system. In this case, such a program may be used by recording in a recording medium such as a floppy disk, a magneto-optic disk, a CD-ROM, a hard disk and the like which can be read by the computer system and by activating it by loading to the computer system as necessary. Beside that, the program may be used by recording in a ROM and a backup RAM as a recording medium which can be read by the computer system and by incorporating such ROM or backup RAM in the computer system.

Exemplary Experiment

Next, an experimental result obtained by verifying a neural network used in the control of a blower speed of car air-conditioner by the neural network verification apparatus which executes the interval error judging process of the second embodiment and the interval network output signal calculating process of the third embodiment will be explained. In this experiment, the performance thereof was evaluated by time necessary for the verification by comparing with the conventional method of verifying the network by inputting test data one by one.

Figure 10:
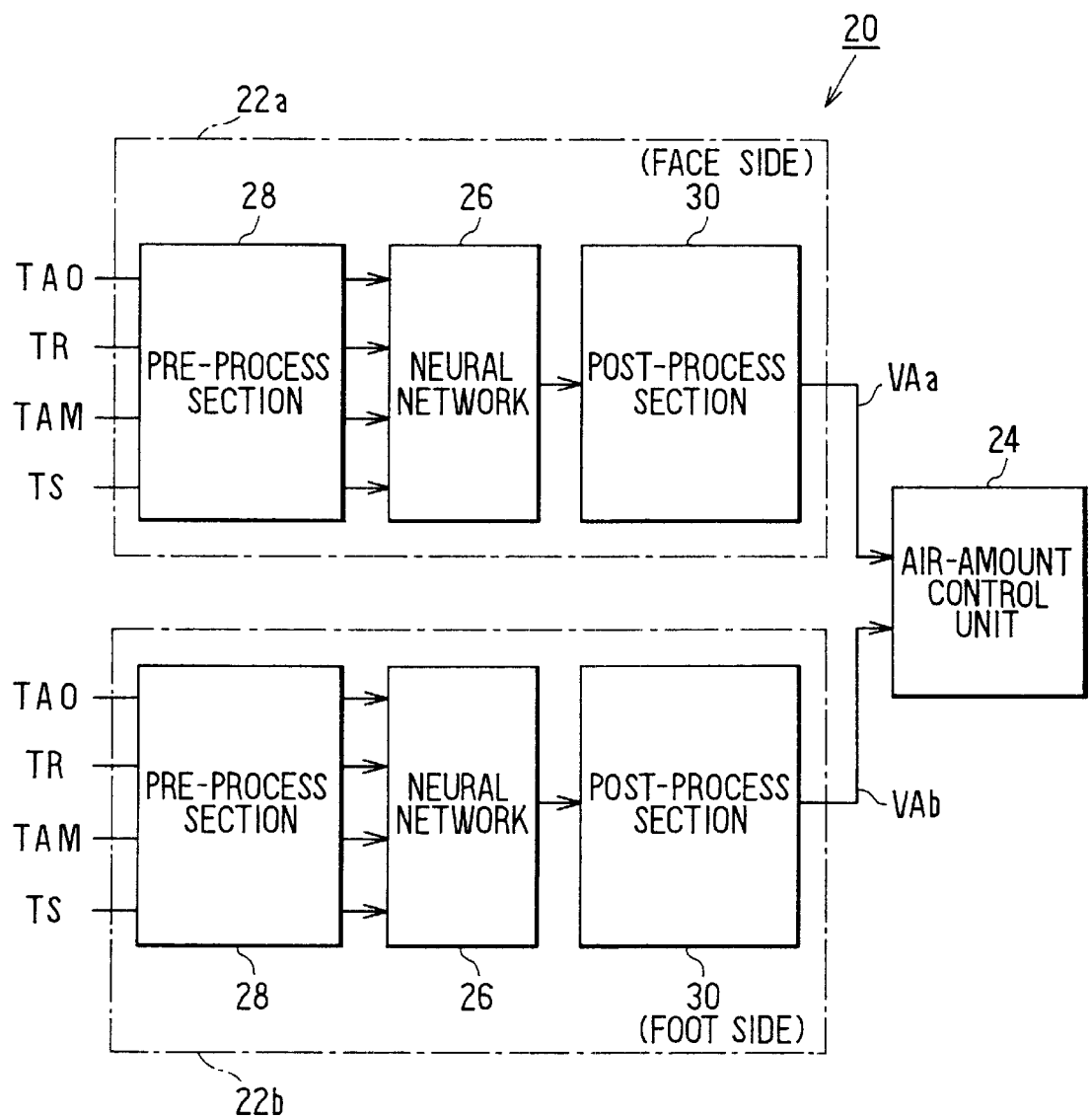
FIG. 10 is a block diagram schematically showing the structure of a blower speed controller which is used in an experiment and to which the neural network is applied.

FIG. 10 schematically shows the structure of a blower speed controller 20 to which the neural network used in the experiment is applied.

As shown in FIG. 10, the blower speed controller 20 comprises a first level setting section 22a for setting a blower speed level VAa at the face side air outlet based on input signals of target air outlet temperature TAO decided based on setting or the like on a control panel not shown and room temperature TR, outside temperature TAM and an amount of solar radiation TS detected by various sensors provided in the vehicle, a second level setting section 22b for setting a blower speed level VAb at the foot side air outlet based on input signals of the target air outlet temperature TAO, the room temperature TR, the outside temperature TAM and the amount of solar radiation TS similarly to the first level setting section 22a, and a blower speed control unit 24 for actually increasing/decreasing the blower speed in accordance to the blower speed levels VAa and VAb set by both level setting sections 22a and 22b.

Then, the first and second level setting sections 22a and 22b (hereinafter referred to simply as a level setting section 22) comprise, respectively, a neural network 26, a pre-processing section 28 for normalizing the above-mentioned input signals to values between 0 and 1 and inputting them to the neural network 26 and a post-processing section 30 for normalizing the output of the neural network 26 to the blower speed level VA having a value between 0 and 31.

It is noted that the both neural networks 26 at the face side (the first level setting section 22a) and the foot side (the second level setting section 22b) used in the experiment were a four-layer type network which is composed of an input layer, a first intermediate layer, a second intermediate layer and an output layer, each layer having a number of neurons (units) as shown in Table 1.

TABLE 1

| Neural Network | Number of Neuron (Units) | | | |
|---|---|---|---|---|
| | Input Layer | First Int. Layer | Second Int. Layer | Output Layer |
| Face Side | 4 | 15 | 10 | 1 |
| Foot Side | 4 | 9 | 7 | 1 |

Table 2 shows the input range and resolution of each input signal.

TABLE 2

| Neural Network | Name of Signal | Input Range | | Resolution |
|---|---|---|---|---|
| Face Side | Target Blow Temp. | (° C.) | −83.2 to 121.6 | $2^{16}$ |
| | Room Temp. | (° C.) | 6.5 to 57.25 | $2^{8}$ |
| | Outside Temp. | (° C.) | −30.8 to 50.8 | $2^{8}$ |
| | Amount of Solar Radiation (W/m²/sec) | | 0.0 to 16.64 | $2^{7}$ |
| Foot Side | Target Blow Temp. | (° C.) | −83.2 to 121.6 | $2^{16}$ |
| | Room Temp. | (° C.) | 6.5 to 57.25 | $2^{8}$ |
| | Outside Temp. | (° C.) | −30.8 to 50.8 | $2^{8}$ |
| | Amount of Solar Radiation (W/m²/sec) | | 0.0 to 16.64 | $2^{7}$ |

It is noted that an input signal S assumes a discrete value expressed by the following equation (43), where VL is the lower bound of the input range of the input signal S, VH is the upper bound and D is the resolution thereof:

$$S = VL + \alpha \cdot i (i=0, 1, \ldots D) \quad (43)$$

where, $\alpha = (VH-VL)/D$

A number of signals possibly inputted to the neural network 26 is D+1 respectively per each input signal. That is, a combination of input signals possibly inputted turns out to be $(2^{16}+1) \times (2^{8}+1) \times (2^{8}+1) \times (2^{7}+1) \approx 5.58 \times 10^{11}$ in case of this exemplary experiment.

After implementing the learning of the neural network 26 thus constructed, by using 203,148 teacher data, the neural network 26 was verified by the verification apparatus to which the invention is applied and by the conventional method by means of test data to compare their verification time.

It is noted that the processing was started without providing any dividing point, i.e., by generating only one interval input vector signal $I_s$ corresponding to the whole input signal space, at first in the verification apparatus.

Meanwhile, although the verification by means of the conventional method should have been made by inputting the whole number ($5.58 \times 10^{11}$) of test data which might be inputted sequentially to the neural network to compare whether or not the network output signal is within the tolerance one by one, it takes very long time. Therefore, the time necessary for verifying 203,148 input signals was actually measured, and based on that, the time necessary for verifying the whole number of input signals was found by estimation.

Table 3 shows the comparison result.

TABLE 3

| | Verification Time | |
|---|---|---|
| Neural Network | Conventional Method | Inventive Verification Apparatus |
| Face Side | 498.0 Days | 6.5 Min. |
| Foot Side | 445.0 Days | 1.9 Min. |

As it is apparent from Table 3, it takes more than 400 days to verify the whole signals which might be inputted without omission and such verification is practically impossible. However, the use of the inventive verification apparatus allows the verification to be completed within 6.5 minutes. That is, it was confirmed that the inventive verification apparatus can quickly verify the neural network whose operation cannot be guaranteed reliably for the whole signals which might be inputted by the conventional method.

First Exemplary Calculation

Next, an exemplary calculation of the interval teacher output signal $t(I_s)$ will be explained concretely.

A case when the input signal is a two-dimensional signal $x=(x_1, x_2) \in [0, 1]^2$ and the teacher output signal $t(x)$ is defined by the following equation (44) will be explained here:

$$t(x) = 0.5 + 0.5 \cdot \sin\{\pi \cdot (x_1 + x_2)\} \quad (44)$$

Possible intervals $X_1$ and $X_2$ of each input signal are:

$$X_1 = [x_1^L, x_1^U] \subset [0, 1]$$

$$X_2 = [x_2^L, x_2^U] \subset [0, 1]$$

Accordingly, when $x_1 + x_2 = y (\in Y)$, $Y = [y^L, y^U] = X_1 + X_2 \subset [0, 2]$.

When y is used instead of x in the equation (44), it is expressed by the following equation (44a) and its graph turns out as shown in FIG. 11:

$$t(y) = 0.5 + 0.5 \cdot \sin\{\pi \cdot y\} \quad (44a)$$

As it is apparent from FIG. 11, $t(y)$ takes the maximum value 1 when $y=0.5$ and takes the minimum value 0 when $y=1.5$, where $0 \leq y \leq 2$, and takes no extreme value other than them.

By utilizing this characteristic, an interval arithmetic value $t(Y)$ of $t(y)$ for the interval $y=[y^L, y^U]$ may be found as follows.

That is, when neither $y=0.5$ nor $y=1.5$ where $t(y)$ assumes the extreme value is contained in the interval Y, the function $t(y)$ increases or decreases monotonously in this interval, so that $t(Y)$ may be found by the following equation (45). Meanwhile, when $y=0.5$ is contained in the interval $y=[y^L, y^U]$, the maximum value is decided, so that $t(Y)$ may be found by the equation (46). When $y=1.5$ is contained, the minimum value is decided, so that $t(Y)$ may be found by the equation (47) and when both $y=0.5$ and $y=1.5$ are contained, the maximum and minimum values are decided, so that $t(Y)$ may be found by the equation (48):

$$t(Y) = [\min\{t(y^L), t(y^U)\}, \max\{t(y^L), t(y^U)\}] \quad (45)$$

$$t(Y) = [\min\{t(y^L), t(y^U)\}, 1] \quad (46)$$

$$t(Y)=[0, \max\{t(y^L), t(y^U)\}] \quad (47)$$

$$t(Y)=[0, 1] \quad (48)$$

Thus, the interval teacher output signal may be found accurately with less calculation amount by utilizing the characteristic of the definition function t(y) by separating the cases of the interval in which the definition function t(y) increases or decreases monotonously and of the interval in which the function contains a value which is the extreme value.

Exemplary calculation substituted by concrete numerical values will be explained below.

Figure 11A:
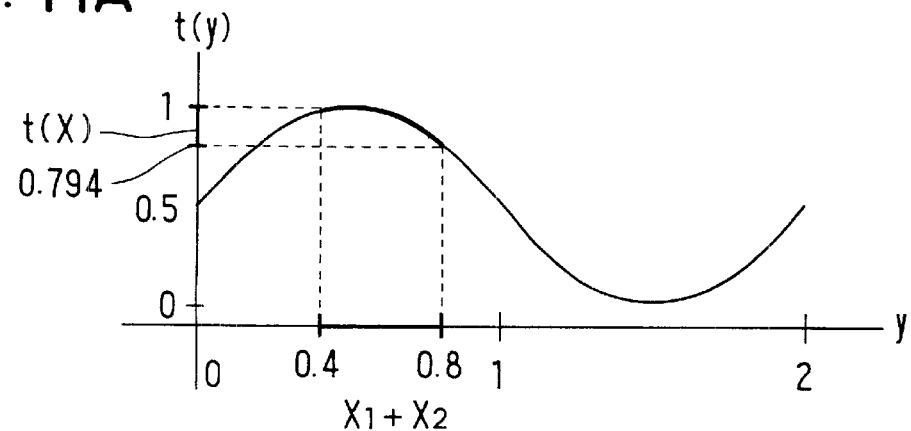
FIGS. 11A through 11C are graphs showing exemplary calculations in calculating an interval teacher output signal.

1) In case of $X_1=[0.2, 0.31]$, $X_2=[0.2, 0.5]$ (see FIG. 11A and Equation (46)):

$t(X)=[0.794, 1]$ from $X_1+X_2=Y=[0.4, 0.8]$

Figure 11B:
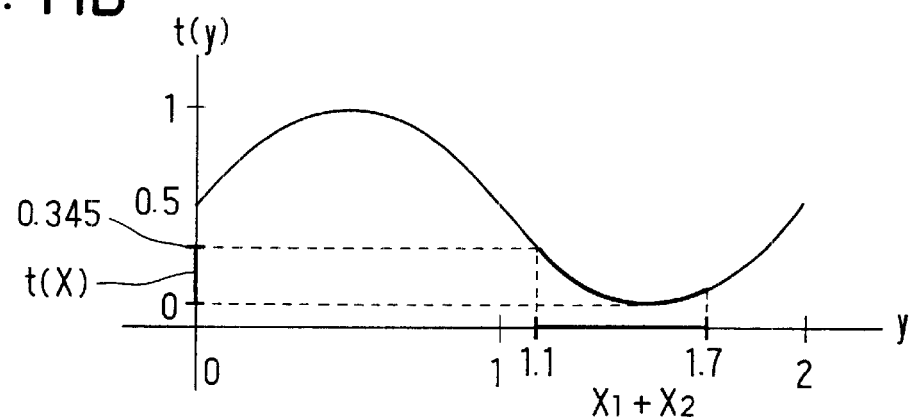

2) In case of $X_1=[0.3, 0.8]$, $X_2=[0.8, 0.9]$ (see FIG. 11B and Equation (47)]:

$t(X)=[0, 0.345]$ from $X_1+X_2=Y=[1.1, 1.7]$

Figure 11C:
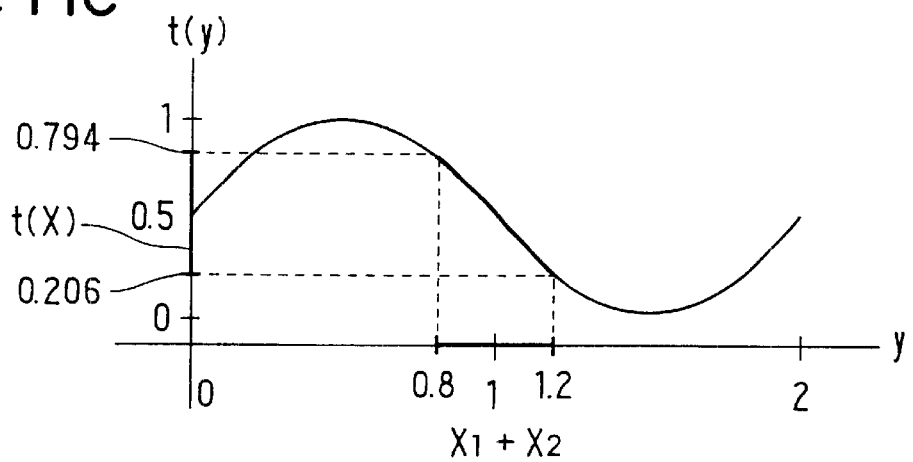

3) In case of $X_1=[0.5, 0.7]$, $X_2=[0.3, 0.5]$ (see FIG. 11C and Equation (45)]:

$t(X)=[0.206, 0.794]$ from $X_1+X_2=Y=[0.8, 1.2]$

Second Exemplary Calculation

The followings are the exemplary calculations for facilitating understanding of the processing contents of the process for calculating the interval network output signal explained in the third embodiment.

Figure 12:
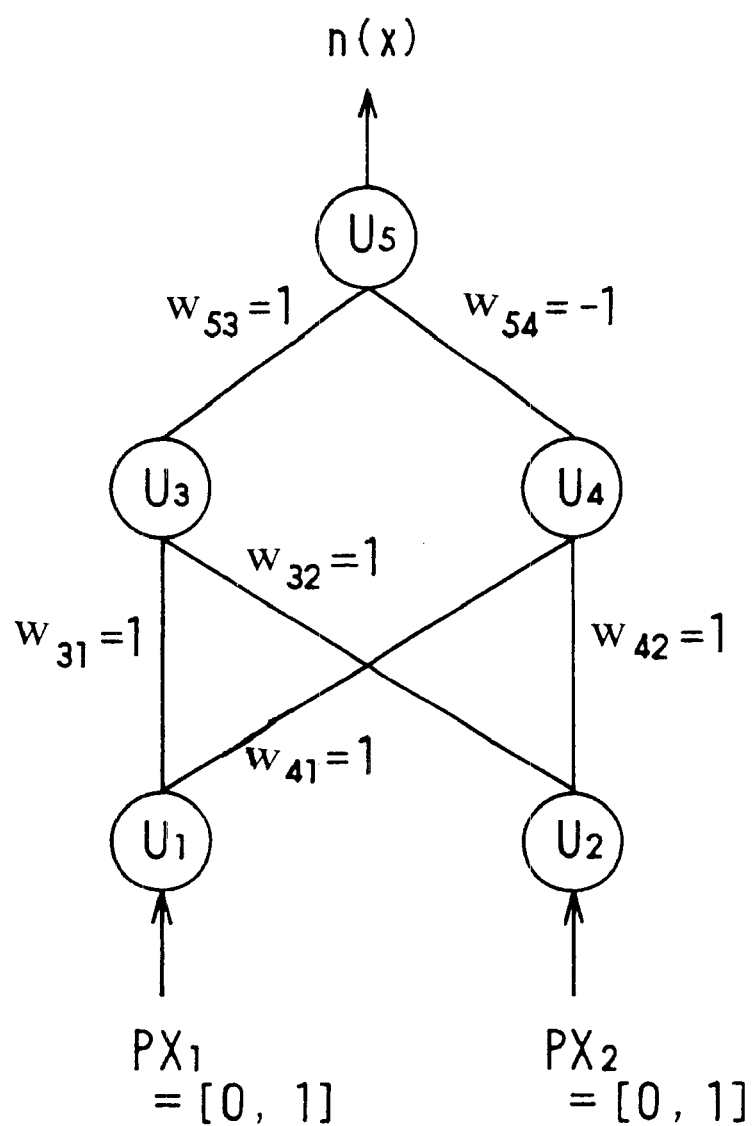
FIG. 12 is a chart showing the configuration of the neural network used in the second exemplary calculation.
Figure 13A:
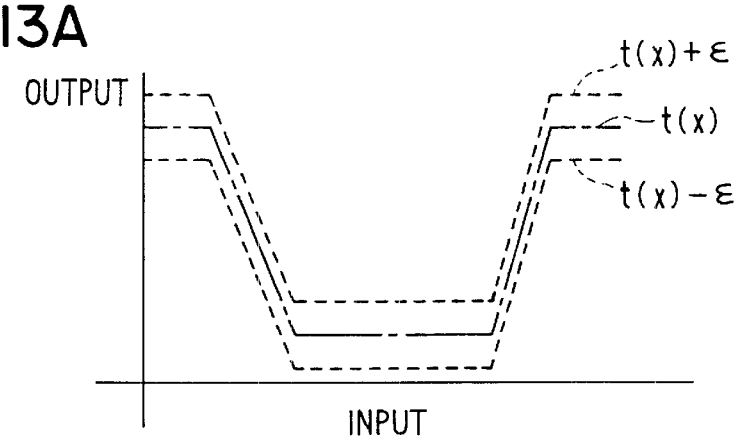
FIGS. 13A through 13C are graphs showing a neural network verification method and a problem thereof.
Figure 13B:
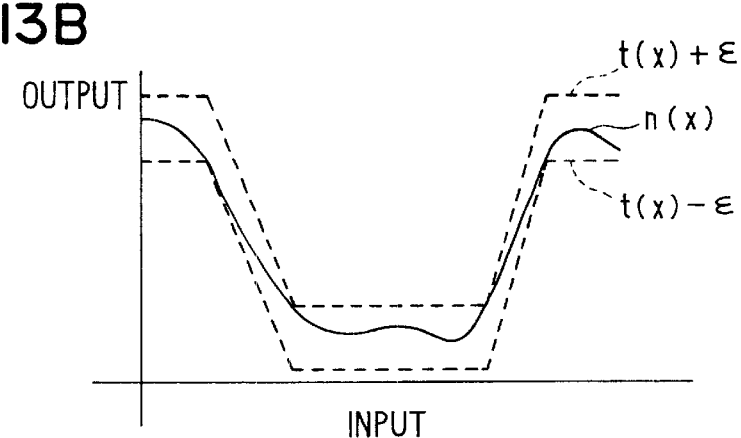
Figure 13C:
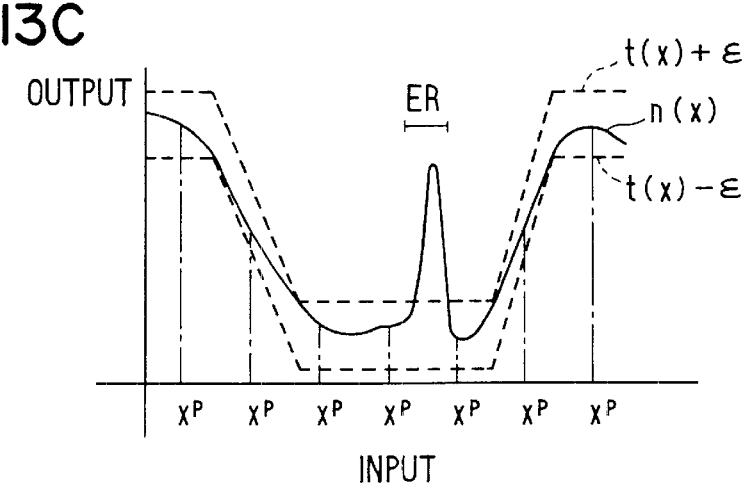

Here, the interval network output signal n(Xtop) will be calculated in concrete for a neural network comprising an input layer (first layer) composed of two units U1 and U2, an intermediate layer (second layer) composed of two units U3 and U4, and an output layer (third layer) composed of one unit as shown in FIG. 12.

It is assumed that biases in synapse connection and in each unit of the intermediate layer and output layer are:

$\omega_{31}=\omega_{32}=\omega_{41}=\omega_{42}=\omega_{53}=1$ $\omega_{54}=-1$ $b_3=b_4=b_5=0$ and that the initial interval input vector signal Xtop is:

$X\mathrm{top}=(XP_1, XP_2)=([0,1], [0,1])^t$

1) Find the center value $x^c$ of the initial interval input vector signal Xtop (S610):

$x^c=(x_1^c, x_2^c)^t=(0.5, 0.5)^t$

2) Find the weighting signal $\mathrm{net}_j^c$ with respect to the center value $x^c$ for each unit $U_j$ (S620). Where, $O_1=O_1=0.5$ because units $U_1$ and $U_2$ output the input as it is:

$\mathrm{net}_3^c=b_3+\omega_{31}\cdot O_1+\omega_{32}\cdot O_2=0+1\times 0.5+1\times 0.5=1.0$ $O_3^c=f(\mathrm{net}_3^c)=0.7310$ $\mathrm{net}_4^c=b_4+\omega_{41}\cdot O_1+\omega_{42}\cdot O_2=0+1\times 0.5+1\times 0.5=1.0$ $O_4^c=f(\mathrm{net}_4^c)=0.7310$ $\mathrm{net}_5^c=b_5+\omega_{53}\cdot O_3+\omega_{54}\cdot O_4=0+1\times 0.7310-1\times 0.7310=0.0$ $O_5^c=f(\mathrm{net}_5^c)=0.5$ 3) Initialize interval output signals $O_1$ and $O_2$ of the units $U_j$ and $U_2$ of the input layer (S630):

$O_1=[0, 1]$ $O_2=[0, 1]$

4) Initialize $\Phi O_m/\Phi XP_n$ at the units $U_1$ and $U_2$ of the input layer (S640):

$\Phi O_1/\Phi XP_1=[1, 1]$ $\Phi O_1/\Phi XP_2=[0, 0]$ $\Phi O_2/\Phi XP_1=[0, 0]$ $\Phi O_2/\Phi XP_2=[1, 1]$

5) For unit $U_3$ (j=3):
   Find a first interval $\mathrm{Net}_3\_1$ (S660):

$\mathrm{Net}_3\_1=b_3+\omega_{31}\cdot O_1+\omega_{32}\cdot O_2=[0, 1]+[0, 1]=[0, 2]$ Find an inclination $\Phi \mathrm{net}_3/\Phi XP_n$ (S670):

$\Phi\mathrm{net}_3/\Phi XP_1=\omega_{31}\cdot(\Phi O_1/\Phi XP_1)+\omega_{32}\cdot(\Phi O_2/\Phi XP_1)=[1, 1]$ $\Phi\mathrm{net}_3/\Phi XP_2=\omega_{31}\cdot(\Phi O_1/\Phi XP_2)+\omega_{32}\cdot(\Phi O_2/\Phi XP_2)=[1, 1]$ Find a second interval $\mathrm{Net}_3\_2$ (S680):

$W=(\Phi\mathrm{net}_3/\Phi XP_1)*(XP_1-x_1^c)+(\Phi\mathrm{net}_3/\Phi XP_2)*(XP_2-x_2^c)=10.5+1\cdot 0.5=1$ $\mathrm{Net}_3\_2=[\mathrm{net}_3^c-W, \mathrm{net}_3^c+W]=[1-1, 1+1]=[0, 2]$ Find a weighting signal $\mathrm{Net}_3$ (S690):

$\mathrm{Net}_3=\mathrm{Net}_3\_1\cap\mathrm{Net}_3\_2=[0, 2]=[\mathrm{net}_3^L, \mathrm{net}_3^U]$ Find an interval output signal (S700):

$O_3=f(\mathrm{Net}_3)=[0.5, 0.881]=[f(\mathrm{net}_3^L), f(\mathrm{net}_3^U)]$

Find an inclination $\Phi f/\Phi \mathrm{net}_3$ (S720):

{Use Equation (39) because $\mathrm{Net}_3=[0, 2]\subset[0, \infty)$} $\Phi f/\Phi\mathrm{Net}_3=0.150, 0.231]$ Find an inclination $\Phi O_{3/\Phi XPm}$ (S730):

ti $\Phi O_3/\Phi XP_1=(\Phi f/\Phi\mathrm{Net}_3)\cdot(\Phi\mathrm{net}_3/\Phi XP_1)=[0.150, 0.231]$ $\Phi O_3/\Phi XP_2=(\Phi f/\Phi\mathrm{Net}_3)\cdot(\Phi\mathrm{net}_3/\Phi XP_2)=[0.150, 0.231]$ 6) For Unit $U_4$ (j=4):
   The following result may be obtained by calculating totally in the same manner with the case of unit $U_3$.

$O_4=f(\mathrm{Net}_3)=[0.5, 0.881]$ $\Phi O_4/\Phi XP_1=(\Phi f/\Phi\mathrm{Net}_4)\cdot(\Phi\mathrm{net}_4/\Phi XP_1)=[10.150, 0.231]$ $\Phi O_4/\Phi XP_2=(\Phi f/\Phi\mathrm{Net}_4)\cdot(\Phi\mathrm{net}_4/\Phi XP_2)=[0.150, 0.231]$ 7) For Unit $U_5$ (j=5):
   Find a first interval $\mathrm{Net}_5\_1$ (S660):

$\mathrm{Net}_5\_1=b_5+\omega_{53}\cdot O_3+\omega_{54}\cdot O_4=[-0.381, 0.381]$ Find an inclination $\Phi\mathrm{net}_5/\Phi XP_1$ (S670):

$\Phi\mathrm{net}_5/\Phi XP_1=\omega_{53}\cdot(\Phi O_3/\Phi XP_1)+\omega_{54}\cdot(\Phi O_4/\Phi XP_1)=[-0.081, 0.081]$ $\Phi\mathrm{net}_5/\Phi XP_2=\omega_{53}\cdot(\Phi O_3/\Phi XP_2)+\omega_{54}\cdot(\Phi O_4/\Phi XP_2)=[-0.081, 0.081]$ Find a second interval $Net_5\_2$ (S680):

$W=(\Phi net_5/\Phi XP_1)*(XP_1-x_1^c)+(\Phi net_5/\Phi XP_2)*(XP_2-x_2^c)=0.081\cdot0.5+0.081\cdot0.5=0.081$ $Net_5\_2=[net_5^c-W, net_5^c+W]=[0.0-0.081, 0.0+0.081]=[-0.081, 0.081]$ Find a weighting signal $Net_5$ (S690):

$Net_5=Net_5\_1 \cap Net_5\_2=[-0.081, 0.081]$

Find an interval output signal $O_5$ (S700):

$O_5=f(Net_5)=[0.480, 0.520]$

8) Set the interval network output signal n(Xtop) (S750):

$n(X\text{top})=O_5=[0.480, 0.520]$

What is claimed is:

1. A verification method of a neural network comprising an input layer, an intermediate layer and an output layer each having one or more units for generating transmission signals and synapses for transmitting said transmission signals by connecting the units between the respective layers, and arranged so as to transmit said transmission signals through said units sequentially toward said output layer when input signals are given to said input layer to set a transmission signal from said output layer as a network output signal and to set synaptic weight so that an error between said network output signal and a present teacher output signal falls within a tolerance, comprising the steps of:

dividing a m-(m is an integer not less than 1) dimensional input signal space to said input layer into a plurality of input signal subspaces while setting a range of each input signal inputted to said input layer respectively as one-dimensional input signal space;

calculating an interval error by using interval arithmetic, the interval error representing an obtainable range of the error between said teacher output signal and said network output signal per said input signal subspace; and verifying said neural network by evaluating said interval error, said evaluating performed by judging an inclusion relationship between said interval error and said tolerance.

2. The verification method according to claim 1, further comprising the steps of:

re-dividing the input signal subspace into a plurality of input signal subspaces, when part of said interval error is judged to be out of said tolerance; and repeating the process of judging said inclusion relationship per said input signal subspace generated by the re-division.

3. The verification method according to claim 2, further comprising a step of inhibiting the re-division of said input signal subspace when a width of said interval error is equal to or less than a limit width which is smaller than a width of said tolerance.

4. The verification method according to claim 1, further comprising the steps of:

setting the respective range of each input signal forming said input signal subspace as an interval input signal;

sequentially calculating an interval transmission signal representing an obtainable range of said transmission signal generated in said unit with respect to said interval input signal per each unit in accordance to the signal transmission route from said input layer to said output layer;

setting an interval transmission signal calculated for the unit of said output layer as an interval network output signal representing an obtainable range of said network output signal; and calculating said interval error based on said interval network output signal.

5. The verification method according to claim 4, wherein the unit of said input layer outputs said input signal as is, wherein the units in said intermediate and output layers generate a weighting signal based on all transmission signals inputted from the unit of the previous stage, and synaptic weight each corresponding to said transmission signal, and generate a transmission signal to be outputted to the following stage by a predetermined output function to which said weighting signal is to be inputted;

said verification method further comprising the steps of:

finding an intersection of a first interval signal found based on a sum of products of said interval transmission signal inputted from the unit of the previous stage and said synaptic weight, with a second interval signal found based on a sum of products of a first inclination representing a range of an obtainable rate of change of said weighting signal with respect to said interval input signal and said interval input signal;

setting said intersection as an interval weighting signal representing an obtainable range of said weighting signal with respect to said interval input signal in the units in said intermediate and output layers; and generating said interval transmission signal based on said interval weighting signal and said output function.

6. The verification method according to claim 5, further comprising steps of:

calculating said first inclination by a sum of products of a second inclination representing an obtainable range of said transmission signal inputted from the unit of the previous stage with respect to said interval input signal and said synaptic weight; and calculating said second inclination for the transmission signal to be outputted to the following stage, by a product of a third inclination representing a range of a slope of said output function with respect to said interval weighting signal and said first inclination.

7. The verification method according to claim 6, wherein said output function f(x) is a sigmoid function or a hyperbolic function and comprising a step of setting said third inclination as [{f(NL)−f(NC)}/{NL−NC}, {f(NU)−f(NC)}/{NU−NC}] when NU<0, as [{f(NU)−f(NC)}/{NU NC}, {f(NL)−f(NC)}/{NL−NC}] when NL≧0 and as [min}f′(NL), f′(NU)}, f′(0)] in cases other than those, wherein f′(x) is a derivative of said output function f(x), [NL, NU] is the interval weighting signal and NC is an interior point thereof.

8. A recording medium into which a program for causing a computer system to execute a neural network verification method is recorded and from which the recorded contents can be read by said computer system:

said neural network comprising an input layer, a intermediate layer and an output layer each having one or more units for generating transmission signals and synapses for transmitting said transmission signals by connecting the units between the respective layers, and arranged so as to transmit said transmission signals through said units sequentially toward said output layer when input signals are given to said input layer to set a transmission signal from said output layer as a network output signal and to set synaptic weight so that an error between said network output signal and a preset teacher output signal falls within a tolerance;

said neural network verification method further comprising steps of:

dividing a m-(m is an integer not less than 1) dimensional input signal space to said input layer into a plurality of input signal subspaces, while setting a range of each input signal inputted to said input layer respectively as one-dimensional input signal space;

calculating an interval error by using interval arithmetic, the interval error representing an obtainable range of the error between said teacher output signal and said network output signal per said input signal subspace; and verifying said neural network by evaluating said interval errors said evaluating performed by judging an inclusion relationship between said interval error and said tolerance.

9. A verification apparatus of a neural network comprising an input layer, an intermediate layer and an output layer each having one or more units for generating transmission signals and synapses for transmitting said transmission signals by connecting the units between the respective layers, and arranged so as to transmit said transmission signals through said units sequentially toward said output layer when input signals are given to said input layer to set a transmission signal from said output layer as a network output signal and to set synaptic weight so that an error between said network output signal and a preset teacher output signal falls within a tolerance;

said neural network verification apparatus further comprising:

interval dividing means for dividing a m-(m is an integer not less than 1) dimensional input signal space to said input layer into a plurality of input signal subspaces, while setting a range of each input signal inputted to said input layer respectively as one-dimensional input signal space;

interval network output signal calculating means for calculating an interval network output signal representing an obtainable range of said network output signal per said input signal subspace;

interval teacher output signal calculating means for calculating interval teacher output signal representing an obtainable range of said teacher output signal per said input signal subspace;

interval error calculating means for calculating an interval error by using interval arithmetic, the interval error representing an obtainable range of an error between said interval network output signal and said interval teacher output signal per said input signal subspace; and judging means for judging an inclusion relationship between said interval error and said tolerance.

10. The verification apparatus according to claim 9, wherein said interval dividing means is provided with interval re-dividing means for redividing the input signal subspace into a plurality of input signal subspaces, when part of said interval error is judged to be out of said tolerance.

11. The verification apparatus according to claim 10, wherein said interval dividing means is provided with re-division inhibiting means for inhibiting the re-division of said input signal subspace implemented by said interval re-dividing means when a width of said interval error is equal to or less than a limit width which is smaller than a width of said tolerance.

12. The verification apparatus according to claim 9, wherein said interval network output signal calculating means sets the respective range of each input signal forming said input signal subspace as an interval input signal;

the apparatus further comprising interval transmission signal calculating means for sequentially calculating an interval transmission signal representing an obtainable range of said transmission signal generated in said unit with respect to said interval input signal per each unit in accordance to the signal transmission route from said input layer to said output layer, and for setting an interval transmission signal calculated for the unit of said output layer by said interval transmission signal calculating means as an interval network output signal representing an obtainable range of said network output signal.

13. The verification apparatus according to claim 12, wherein the unit of said input layer outputs said input signal as is, wherein the units in said intermediate and output layers generate a weighting signal based on all transmission signals inputted from the unit of the previous stage and synaptic weight each corresponding to said transmission signal, and generate a transmission signal to be outputted to the following stage by a predetermined output function to which said weighting signal is to be inputted;

said interval transmission signal calculating means further comprising:

first interval signal calculating means for calculating a first interval signal based on a sum of products of said interval transmission signal inputted from the unit of the previous stage and said synaptic weight;

second interval signal calculating means for calculating a second interval signal based on a sum of products of a first inclination representing a range of an obtainable rate of change of said weighting signal with respect to said interval input signal and said interval input signal;

intersection extraction means for setting an intersection of said first and second interval signals as an interval weighting signal representing an obtainable range of said weighting signal with respect to said interval input signal; and interval transmission signal generating means for generating said interval transmission signal based on said interval weighting signal set by said intersection extraction means and said output function.

14. The verification apparatus according to claim 13, further comprising:

first inclination calculating means for calculating said first inclination by a sum of products of a second inclination representing an obtainable range of said transmission signal inputted from the unit of the previous stage with respect to said interval input signal and said synaptic weight; and second inclination calculating means for calculating said second inclination for the transmission signal to be outputted to the following stage by a product of a third inclination representing an obtainable range of a slope of said output function with respect to said interval weighting signal and said first inclination.

15. The verification apparatus according to claim 14, wherein said output function $f(x)$ is one of a sigmoid function and a hyperbolic function, and said verification apparatus further comprising third inclination setting means for setting said third inclination as [{f(NL)−f(NC)}/{NL−NC}, {f(NU)−f(NC)}/{NU−NC}] when NU<0, as [{f(NU)−f(NC)}/{NU−NC}, {f(NL)−f(NC)}/{NL−NC}] when NL≧0 and as [min{f′(NL), f′(NU)}, f′(0)] in cases other than those, wherein f′(x) is a derivative of said output function f(x), [NL, NU] is the interval weighting signal and NC is an interior point thereof.

16. A production method of an air-conditioner using a neural network, comprising:
  a neural network constructing step for constructing the neural network comprising an input layer, an intermediate layer and an output layer each having one or more units for generating transmission signals and synapses for transmitting said transmission signals by connecting the units between the respective layers, and arranged so as to transmit said transmission signals through said units sequentially toward said output layer when input signals are given to said input layer to set a transmission signal from said output layer as a network output signal and to set synaptic weight so that an error between said network output signal and a preset teacher output signal falls within a tolerance; and
  a verifying step for verifying the operation of said neural network;
  said verifying step further comprising:
    a dividing step for dividing a m-(m is an integer not less than 1) dimensional input signal space to said input layer into a plurality of input signal subspaces, while setting a range of each input signal inputted to said input layer respectively as one-dimensional input signal space;
    a calculating step for calculating an interval error by using interval arithmetic, the interval error representing an obtainable range of the error between said teacher output signal and said network output signal per said input signal subspace; and
    an evaluating step for evaluating said interval error, said evaluating step further including judging an inclusion relationship between said interval error and said tolerance.

17. A production method of an air-conditioner using a neural network, comprising:
  a neural network constructing step for constructing the neural network comprising an input layer, an intermediate layer and an output layer each having one or more units for generating transmission signals and synapses for transmitting said transmission signals by connecting the units between the respective layers, and arranged so as to transmit said transmission signals through said units sequentially toward said output layer when input signals are given to said input layer to set a transmission signal from said output layer as a network output signal and to set synaptic weight so that an error between said network output signal and a preset teacher output signal falls within a tolerance; and
  a verifying step for verifying the operation of said neural network;
  said verifying step further comprising:
    a dividing step for dividing a m-(m is an integer not less than 1) dimensional input signal space to said input layer into a plurality of input signal subspaces while setting a range of each input signal inputted to said input layer respectively as one-dimensional input signal space;
    an interval network output signal calculating step for calculating an interval network output signal representing an obtainable range of said network output signal per said input signal subspace;
    an interval teacher output signal calculating step for calculating interval teacher output signal representing an obtainable range of said teacher output signal per said input signal subspace;
    an interval error calculating step for calculating an interval error using interval arithmetic, said interval error representing an obtainable range of an error between said interval network output signal and said interval teacher output signal per said input signal subspace; and
    judging means for judging an inclusion relationship between said interval error and said tolerance.

18. The production method of an air-conditioner according to claim 17, wherein said interval dividing step contains an interval re-dividing step for re-dividing the input signal subspace into a plurality of input signal subspaces, when part of said interval error is judged to be out of said tolerance re-dividing the input signal subspace into a plurality of input signal subspaces, when part of said interval error is judged to be out of said tolerance.

19. The production method of an air-conditioner according to claim 18, wherein said interval dividing step contains a re-division inhibiting step for inhibiting the re-division of said input signal subspace implemented by said interval re-dividing step when a width of said interval error is equal to or less than a limit width which is smaller than a width of said tolerance.

20. The production method of an air-conditioner according to claim 17, wherein said interval network output signal calculating step sets the respective range of each input signal forming said input signal subspace as an interval input signal;
  the method further comprising an interval transmission signal calculating step for sequentially calculating an interval transmission signal representing an obtainable range of said transmission signal generated in said unit with respect to said interval input signal per each unit in accordance to the signal transmission route from said input layer to said output layer, and for setting an interval transmission signal calculated for the unit of said output layer as an interval network output signal representing an obtainable range of said network output signal.

21. The production method of an air-conditioner according to claim 20,
  wherein the unit of said input layer outputs said input signal as is,
  wherein the units in said intermediate and output layers generate a weighting signal based on all transmission signals inputted from the unit of the previous stage and synaptic weight each corresponding to said transmission signal, and generate a transmission signal to be outputted to the following stage by a predetermined output function to which said weighting signal is to be inputted;
  said interval transmission signal calculating step further comprising
    a first interval signal calculating step for calculating a first interval signal based on a sum of products of said interval transmission signal inputted from the unit of the previous stage and said synaptic weight;
    a second interval signal calculating step for calculating a second interval signal based on a sum of products of a first inclination representing a range of an obtainable rate of change of said weighting signal with respect to said interval input signal and said interval input signal;

an intersection extraction step for setting an intersection of said first and second interval signals as an interval weighting signal representing an obtainable range of said weighting signal with respect to said interval input signal; and an interval transmission signal generating step for generating said interval transmission signal based on said interval weighting signal set by said intersection extraction means and said output function.

22. The production method of an air-conditioner according to claim 21, further comprising:

a first inclination calculating step for calculating said first inclination by a sum of products of a second inclination representing an obtainable range of said transmission signal inputted from the unit of the previous stage with respect to said interval input signal and said synaptic weight; and a second inclination calculating step for calculating said second inclination for the transmission signal to be outputted to the following stage by a product of a third inclination representing an obtainable range of a slope of said output function with respect to said interval weighting signal and said first inclination.

23. The production method of an air-conditioner according to claim 22, wherein said output function f(x) is a sigmoid function or a hyperbolic function and said production method of an air-conditioner further comprising a third inclination setting step for setting said third inclination as [{f(NL)−f(NC)}/{NL−NC}, {f(NU)−f(NC)}/{NU−NC}] when NU<0, as [{f(NU)−f(NC)}/{NU−NC}, {f(NL)−f(NC)}/{NL−NC}] when NL≧0 and as [min{f'(NL), f'(NU)}, f'(0)] in cases other than those, wherein f'(x) is a derivative of said output function f(x), [NL, NU] is the interval weighting signal and NC is an interior point thereof.

* * * * *

UNITED STATES PATENT AND TRADEMARK OFFICE
CERTIFICATE OF CORRECTION

PATENT NO.      : 6,466,924 B1
DATED           : October 15, 2002
INVENTOR(S)     : Masahiko Tateishi et al.

It is certified that error appears in the above-identified patent and that said Letters Patent is hereby corrected as shown below:

<u>Title page,</u>
Item [30], delete Foreign Application Priority Data:

"Dec. 2, 1997  (JP)     9-332068"

Signed and Sealed this

Eighteenth Day of March, 2003

JAMES E. ROGAN
*Director of the United States Patent and Trademark Office*